United States Patent
Nagai et al.

(10) Patent No.: US 7,612,953 B2
(45) Date of Patent: Nov. 3, 2009

(54) OPTICAL ELEMENT MODULE AND IMAGE PICKUP DEVICE

(75) Inventors: Nobuyuki Nagai, Kanagawa (JP); Akira Ono, Kanagawa (JP); Yasuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/242,405

(22) Filed: Sep. 30, 2008

(65) Prior Publication Data

US 2009/0091832 A1    Apr. 9, 2009

(30) Foreign Application Priority Data

Oct. 5, 2007    (JP)    ............... 2007-261848

(51) Int. Cl.
*G02B 7/02*    (2006.01)
*H01L 41/00*    (2006.01)

(52) U.S. Cl. ................. 359/814; 359/824; 310/330; 310/332

(58) Field of Classification Search ........... 359/814, 359/824, 811, 557; 310/309–311, 328, 330–332, 310/363–365, 367, 800; 369/44.14–44.16; 348/335, 345, E5.045, E5.046
See application file for complete search history.

(56) References Cited

U.S. PATENT DOCUMENTS

| | | | |
|---|---|---|---|
| 6,545,391 B1 * | 4/2003 | Su et al. ............... | 310/332 |
| 6,881,307 B2 * | 4/2005 | Ikegawa ............... | 204/230.2 |
| 7,064,473 B2 * | 6/2006 | Ishibashi et al. ....... | 310/330 |
| 7,242,134 B2 * | 7/2007 | Wallace et al. ........ | 310/363 |
| 7,259,495 B2 * | 8/2007 | Asai et al. ............ | 310/311 |
| 7,259,503 B2 * | 8/2007 | Pei et al. .............. | 310/363 |
| 7,514,850 B2 * | 4/2009 | Asai, Katsuhiko ..... | 310/328 |
| 2007/0285558 A1 * | 12/2007 | Oohara et al. ......... | 348/345 |
| 2009/0091829 A1 * | 4/2009 | Nagai et al. .......... | 359/557 |

FOREIGN PATENT DOCUMENTS

| | | |
|---|---|---|
| JP | 09-243320 | 9/1997 |
| JP | 2003-031906 | 1/2003 |
| JP | 2003-060288 | 2/2003 |
| JP | 2004-221384 | 8/2004 |
| JP | 2004-221385 | 8/2004 |
| JP | 2004-273955 | 9/2004 |
| JP | 2005-116728 | 4/2005 |
| JP | 2006-269988 | 10/2006 |
| JP | 2007-129295 | 5/2007 |
| JP | 2007-147843 | 6/2007 |

\* cited by examiner

*Primary Examiner*—Loha Ben
(74) *Attorney, Agent, or Firm*—K&L Gates LLP

(57) ABSTRACT

An optical element module includes an optical element, and a plurality of actuator elements. In the module, each actuator element has an ion conductive polymer film and electrodes arranged on both sides of the film, and a whole of the actuator element is bent in a direction of thickness by applying a voltage between the electrodes, and the direction of the thickness of the actuator elements is a direction of an optical axis of the optical element, the actuator elements are arranged at equal intervals around the optical axis on a plane perpendicular to the optical axis, and a displacement due to the bend of one end part of at least one actuator element acts on one of a side surface and a bottom surface of the optical element to effect one of tilting and movement in the direction of the optical axis of the optical element.

10 Claims, 16 Drawing Sheets

OPTICAL ELEMENT MODULE AND IMAGE PICKUP DEVICE

CROSS REFERENCES TO RELATED APPLICATIONS

The present application claims priority to Japanese Patent Application JP 2007-261848, filed in the Japan Patent Office on Oct. 5, 2007, the entire contents of which being incorporated herein by reference.

BACKGROUND

The present application relates to an optical element module using a polymer actuator element, and an image pickup device that makes hand movement correction or focus and zoom adjustment using the optical element module.

A hand movement correcting function has recently been becoming a standard in a digital camera with increase in the number of pixels and improvement in functionality. An optical hand movement correction, in particular, has recently been incorporated in addition to a digital hand movement correction (for example, see Japanese Application No. 09-243320, hereinafter "Patent Document 1").

In the case of optical hand movement correction, however, an actuator mechanism using magnetism such as a linear motor as in the example of the above-mentioned Patent Document 1 or the like is mainly employed. Therefore, the size of a module as a whole is increased, and it is difficult to make the size of a camera smaller.

In addition, a camera included in a portable telephone has been increased in the number of pixels, and is thus likely to need a hand movement correction in the future. However, it is very difficult for an actuator mechanism now in use to be of such a size as to be included in a portable telephone and be provided with an optical hand movement correcting function.

To address these problems, image pickup devices provided with a hand movement correcting function using a polymer actuator have recently been proposed (for example, see Japanese Patent Laid-open Nos. 2007-129295 and 2007-147843, hereinafter "Patent Documents 2 and 3," respectively). However, the image pickup devices in Patent Documents 2 and 3 tilt the whole of a casing to which an image pickup optical system and an image pickup element are attached using a displacement of a polymer actuator. Thus, a space for tilting the whole of the casing is required, and the devices as a whole are not sufficiently miniaturized.

SUMMARY

The present application has been made in view of the problems in known techniques as referenced above. It is desirable to provide an optical element module that can be miniaturized by a simple structure using a polymer actuator and which can make hand movement correction, and an image pickup device using the optical element module. In addition, it is desirable to provide an optical element module that can make focus and zoom adjustment, and an image pickup device using the optical element module.

The present application provided to solve the above problems is as follows.

In an embodiment, an optical element module is provided including an optical element and a plurality of actuator elements (FIGS. 2 to 4C), wherein each of the actuator elements has an ion conductive polymer film (ion conductive polymer film 1) in a shape of a long and narrow plate and electrodes (electrode films 2) arranged on both sides of the ion conductive polymer film, and a whole of the actuator element is bent in a direction of thickness by applying a voltage between the electrodes, and the direction of the thickness of the plurality of actuator elements is a direction of an optical axis of the optical element, the plurality of actuator elements are arranged at equal intervals around the optical axis of the optical element on a plane perpendicular to the optical axis of the optical element (XY plane), and a displacement due to the bend of one end part in a direction of length of at least one actuator element acts on one of a side surface and a bottom surface of the optical element to effect one of tilting and movement in the direction of the optical axis of the optical element.

In an embodiment, the optical element is one of a lens, a lens and a lens holder, an light receiving element, and a combination of the lens, the lens holder, and the light receiving element.

In an embodiment, the electrodes are a conductive film formed by dispersing carbon particles into a resin.

In an embodiment, each of the actuator elements is formed by laminating, in the direction of the thickness, a plurality of actuator elements each having electrodes on both sides of an ion conductive polymer film in a shape of an oblong strip.

The optical element module (FIGS. 1A and 1B and FIGS. 5A, 5B, and 5C) in an embodiment, further including a fixing frame (fixing frame 12) for housing the optical element (optical element 11) and the plurality of actuator elements (polymer actuator elements 10a, 10b, 10c, and 10d), wherein the plurality of actuator elements are four actuator elements in a form of an oblong strip, of the four actuator elements, two actuator elements (polymer actuator elements 10a and 10b) are arranged in a point-symmetric relation to each other with respect to the optical axis with the optical element interposed between the two actuator elements in one direction (X-direction) on the XY plane, the other two actuator elements (polymer actuator elements 10c and 10d) are arranged in a point-symmetric relation to each other with respect to the optical axis with the optical element interposed between the other two actuator elements in a direction (Y-direction) orthogonal to the X-direction, one end part of each of the actuator elements is coupled to one of the bottom surface and the side surface of the optical element such that a displacement of the one end part can be transmitted to one of the bottom surface and the side surface of the optical element, and another end part of each of the actuator elements is fixed to the fixing frame.

The optical element module (FIGS. 6A to 8C) according to an embodiment, further including an inner frame (inner frame 22) for containing the optical element (optical element 21 formed by a lens 21a and a lens holder 21b) and an outer frame (outer frame 23) for containing the inner frame together with the optical element, wherein the plurality of actuator elements are four actuator elements (polymer actuator elements 20a, 20b, 20c, and 20d) in a shape of an oblong strip, of the four actuator elements, two actuator elements (polymer actuator elements 20a and 20b) are arranged within the inner frame so as to be in a point-symmetric relation to each other with respect to the optical axis with the optical element interposed between the two actuator elements in one direction (X-direction) on the XY plane, one end part of each of the two actuator elements is coupled to the side surface of the optical element such that a displacement of the one end part can be transmitted to the side surface of the optical element, and another end part of each of the two actuator elements is fixed to an inner wall of the inner frame, and the other two actuator elements (polymer actuator elements 20c and 20d) are arranged within the outer frame so as to be in a point-symmetric relation to each other with respect to the optical axis with the inner frame and the optical element interposed between the other two actuator elements in a direction (Y-direction) orthogonal to the X-direction, one end part of each of the other two actuator elements is coupled to an outer wall of the inner frame such that a displacement of the one end part can be transmitted to the outer wall of the inner frame, and another end part of each of the other two actuator elements is fixed to an inner wall of the outer frame.

The optical element module (FIGS. 9A to 11B) according to an embodiment, further including a flat-shaped base (base 32) mounted with the optical element (optical element 31) and the plurality of actuator elements (polymer actuator elements 30a, 30b, and 30c), wherein the plurality of actuator elements are three actuator elements or more arranged between the bottom surface of the optical element and the base and are arranged at equal intervals in a direction of length of the actuator elements along a circumference having the optical axis of the optical element as a center of the circumference, one end part of each of the actuator elements is fixed to the bottom surface of the optical element, and another end part of each of the actuator elements is fixed to the base.

The optical element module (FIGS. 12A to 13C) according to an embodiment, further including a base (base 42) mounted with the plurality of actuator elements (polymer actuator elements 40a, 40b, 40c, and 40d), wherein the plurality of actuator elements are four actuator elements in a shape of an oblong strip arranged on a bottom surface side of the optical element (optical element 41 formed by a lens 41a and a light receiving element 41b) and are arranged such that directions of length of the actuator elements are directions of radiating from the optical axis as a center and such that actuator elements adjacent to each other form an angle of 90°, one end part of each of the actuator elements is coupled to the bottom surface of the optical element via an arm member (arm member 40p) such that a displacement of the one end part can be transmitted to the bottom surface of the optical element, and another end part of each of the actuator elements is fixed to the base.

An image pickup device (FIG. 17 and FIG. 18) in an embodiment including the optical element module in an image pickup optical system, wherein the optical element is tilted by driving the optical element module at a time of photographing to make hand movement correction.

An image pickup device (FIG. 17) including the optical element module in an embodiment whose optical element is one of a lens and a lens holder or a lens in an image pickup optical system, wherein the optical element is moved in the direction of the optical axis by driving the optical element module to make one of focus adjustment and zoom adjustment.

According to an optical element module according to an embodiment, it is possible to utilize advantages of a polymer actuator of having a great generating force, a large amount of deformation, and high flexibility while having a small thickness and a light weight, and miniaturize the optical element module by a simple structure.

In addition, according to an image pickup device according to an embodiment, it is possible to miniaturize the image pickup device as a whole by using an optical element module according to an embodiment, and make hand movement correction by tilting an optical element. Further, it is possible to make focus adjustment or zoom adjustment by moving an optical element in the direction of an optical axis.

Additional features and advantages are described herein, and will be apparent from the following Detailed Description and the figures.

DETAILED DESCRIPTION

A constitution of an optical element module according to an embodiment of the present application will hereinafter be described. It is to be noted that while the present application will be described with an embodiment shown in drawings, the present application is not limited to this. Changes can be made as appropriate according to embodiments. Any embodiment is included in the scope of the present application as long as the embodiment exerts action and effect of the subject matter of the present application.

An optical element module according to an embodiment includes an optical element and a plurality of actuator elements, wherein the actuator elements has an ion conductive polymer film in a form of a long and narrow plate and electrodes disposed on both sides of the ion conductive polymer film, and the actuator elements as a whole bend in a direction of thickness by applying a voltage between the electrodes, and the direction of thickness of the plurality of actuator elements is a direction of an optical axis of the optical element, the plurality of actuator elements are arranged at equal intervals around the optical axis of the optical element on a plane (XY plane) perpendicular to the optical axis of the optical element, and a displacement due to the bend of one end part in a direction of length of at least one actuator element acts on one of a side surface and a bottom surface of the optical element to effect one of tilting and movement in the direction of the optical axis of the optical element. A space required for a driving mechanism that tilts or moves the optical element is only the size of the actuator elements and the bending space of the actuator elements. Thus, a compact optical element module can be formed.

Figure 1A:
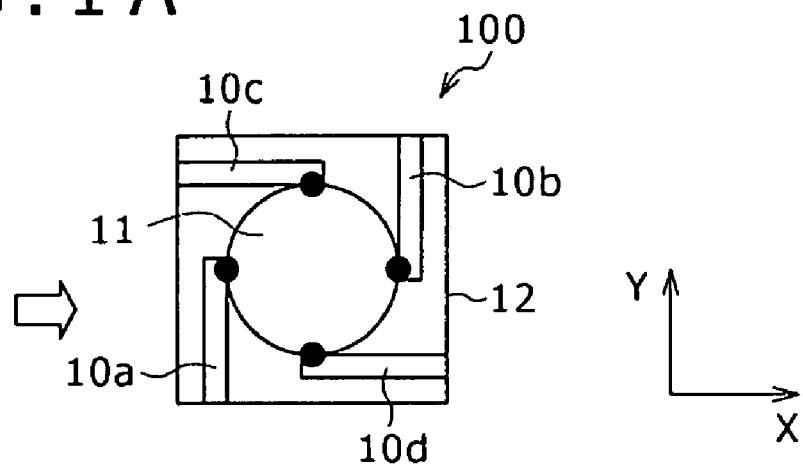
FIGS. 1A and 1B are schematic diagrams showing a constitution of a first embodiment of an optical element module.
Figure 1B:
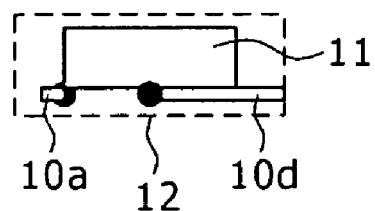

FIGS. 1A and 1B are schematic diagrams showing a constitution of a first embodiment of an optical element module. FIG. 1A is a front view of an optical element module 100 as viewed from above along the optical axis of an optical element. FIG. 1B is a side view of the optical element module 100.

The optical element module 100 includes an optical element 11, a plurality of actuator elements 10a, 10b, 10c, and 10d, and a fixing frame 12 housing the optical element 11 and the actuator elements 10a, 10b, 10c, and 10d. The plurality of actuator elements 10a, 10b, 10c, and 10d are four actuator elements in the form of an oblong strip. Of the four actuator elements, two actuator elements 10a and 10b are arranged in a point-symmetric relation to each other with respect to the optical axis of the optical element 11 with the optical element 11 interposed between the two actuator elements 10a and 10b in one direction (X-direction) on the XY plane. The other two actuator elements 10c and 10d are arranged in a point-symmetric relation to each other with respect to the optical axis with the optical element 11 interposed between the two actuator elements 10c and 10d in a direction (Y-direction) orthogonal to the X-direction. The actuator elements 10a, 10b, 10c, and 10d each have one end part thereof coupled to the bottom surface or the side surface of the optical element 11 such that a displacement of the one end part can be transmitted to the bottom surface or the side surface of the optical element 11. The actuator elements 10a, 10b, 10c, and 10d each have another end part thereof fixed to the fixing frame 12. Incidentally, it is desirable that a structure for coupling the one end part such that the displacement can be transmitted for example use a universal joint at the junction part or that the coupling part be a ball point arm structure. Alternatively, the coupling part may be formed via a flexible leaf spring or a plastic film.

In this case, the optical element 11 is one of a lens, a lens and a lens holder, and an image pickup element (light receiving element) such as a CCD or the like, or a combination thereof. FIGS. 1A and 1B show the optical element 11 formed by a simple lens. Another end part of each of the polymer actuator elements 10a, 10b, 10c, and 10d is fixed to the fixing frame 12. The fixing frame 12 has sufficient stiffness to support at least the polymer actuator elements 10a, 10b, 10c, and 10d and the optical element 11.

In the optical element module 100 assembled as the above-described constitution, the polymer actuator elements 10a, 10b, 10c, and 10d to which no voltage is applied are in a state as of a leaf spring. Thus, the polymer actuator elements 10a, 10b, 10c, and 10d to which no voltage is applied are in an initial state shown in FIGS. 1A and 1B, that is, the optical element 11 is retained such that the optical axis of the optical element 11 is the vertical direction of the optical element module 100. Alternatively, the position of the optical element 11 may be regulated by adding a separate leaf spring or the like. In addition, although there is less optical effect when the polymer actuator elements 10a, 10b, 10c, and 10d are fixed on the outside of the optical element 11, when there is an actually unused area, the polymer actuator elements 10a, 10b, 10c, and 10d may be fixed on the inside of the optical element 11 in a region where no effect is produced. In addition, smoother operation is made possible by providing a space by a spacer or an arm to the coupling parts where the optical element 11 is coupled to the polymer actuator elements 10a, 10b, 10c, and 10d.

In this case, the polymer actuator elements 10a, 10b, 10c, and 10d (hereinafter described collectively as a polymer actuator element 10) have the shape of an oblong strip. The polymer actuator element 10 may be a hitherto known actuator element disclosed in Japanese Patent No. 2961125, Japanese Patent Laid-open No. Hei 11-206162 or the like. In addition, the following constitution, for example, is desirably used.

Figure 2:
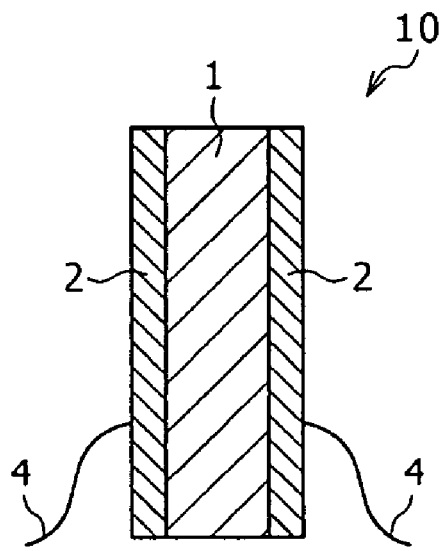
FIG. 2 is a sectional view of a constitution (1) of a polymer actuator element used in an embodiment.

FIG. 2 is a sectional view of a basic constitution of a polymer actuator element. Incidentally, an ion conductive polymer in this case is in the shape of a film as one form (ion conductive polymer film).

The polymer actuator element 10 includes an ion conductive polymer film 1 impregnated with a water base electrolytic solution, electrode films 2 provided on both sides of the ion conductive polymer film 1, and leads 4 electrically connected to the respective electrode films 2. The pair of leads 4 applies a voltage between the electrode films 2, whereby the ion conductive polymer film 1 is bent or deformed.

The ion conductive polymer film 1 is formed by an ion exchange resin having a fluoroplastic or a hydrocarbon base as a skeleton, and assumes the shape of an oblong strip having two principal planes on both sides. The ion exchange resin may be any of an anion exchange resin, a cation exchange resin, and both ion exchange resins. Of these resins, the cation exchange resin is suitable.

Cation exchange resins formed by introducing a functional group such as a sulfonic acid group, a carboxyl group or the like into polyethylene, polystyrene, a fluoroplastic or the like are cited. A cation exchange resin formed by introducing a functional group such as a sulfonic acid group, a carboxyl group or the like into a fluoroplastic, in particular, is desirable. For example, Nafion (N-112) can be used.

The electrode films 2 are formed of carbon powder (carbon particles) and an ion conductive resin. In the electrode films 2, the carbon powder is dispersed into the ion conductive resin, and in that the carbon powder is bonded together via the ion conductive resin. The carbon powder is fine powder of carbon black having conductivity. The larger the specific surface area of the carbon powder, the larger the surface area of the carbon powder as electrode films 2 in contact with the ion conductive polymer film 1, so that a larger amount of deformation can be obtained. Ketjen black, for example, is desirable. The ion conductive resin may be the same as a material forming the ion conductive polymer film 1. Specifically, the ion conductive resin is formed by a coating of a paint obtained by mixing ketjen black (BET=800 m$^2$/g) and 5 wt % of a Nafion solution together at a solid content ratio of 1:3. Alternatively, gold or platinum may be directly reduced in a Nafion resin.

The electrode films 2 take such a constitution, and thereby have a proper degree of stiffness while having flexibility. In addition, because the electrode films 2 support the soft ion conductive polymer film 1 from both sides, the polymer actuator element 10 as a whole can have sufficient stiffness to support the optical element while having flexibility. Further, the polymer actuator element 10 as a whole has a spring characteristic similar to that of a leaf spring in a state in which no voltage is applied.

The electrode films 2 are formed by coating the ion conductive polymer film 1 with a paint including an ion conductive resin component and carbon powder. Alternatively, the electrode films 2 are formed by compression-bonding a conductive film made of carbon powder and an ion conductive resin to the ion conductive polymer film 1.

The electrode films 2 can be formed easily in a short time by either method.

Incidentally, the ion conductive polymer film 1 is at least impregnated with a cationic substance. The cationic substance is desirably water and metallic ions, water and organic ions, or an ionic liquid. The metallic ions include for example sodium ions, potassium ions, lithium ions, and magnesium ions. The organic ions include for example alkylammonium ions. These ions are present as hydrate in the ion conductive polymer film 1. When the ion conductive polymer film 1 includes water and metallic ions or water and organic ions, and is thus in a hydrous state, the polymer actuator element 10 is desirably sealed so that the water does not volatilize from the inside.

The ionic liquid is a solvent of only nonflammable and nonvolatile ions referred to also as room temperature molten salt. An ionic liquid of an imidazolium ring base compound, a pyridinium ring base compound, or an aliphatic base compound, for example, can be used. When the ion conductive polymer film 1 is impregnated with an ionic liquid, the polymer actuator element 10 can be used at a high temperature or in a vacuum without a fear of volatilization.

Figure 3:
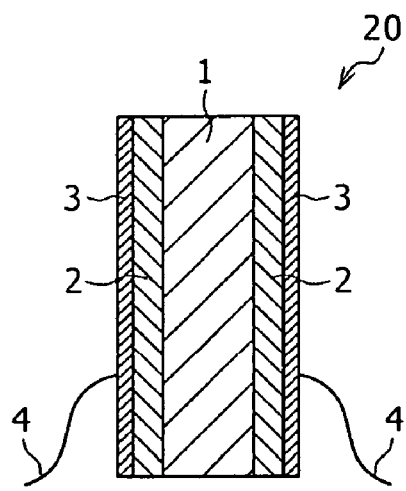
FIG. 3 is a sectional view of a constitution (2) of a polymer actuator element used in an embodiment.

FIG. 3 shows an example of modification of the polymer actuator element.

FIG. 3 is a sectional view of a basic constitution of another polymer actuator element forming a polymer actuator element according to an embodiment.

The polymer actuator element 20 has metallic conductive films 3 of gold or platinum on the pair of electrode films 2, respectively, of the above-described polymer actuator element 10. Leads 4 are electrically connected to the metallic conductive films 3. In this case, an ion conductive polymer film 1, the electrode films 2, and a water base electrolytic solution with which the ion conductive polymer film 1 is impregnated are the same as in FIG. 2.

In this case, the metallic conductive films 3 are made by forming a thin film of gold or platinum on the pair of electrode films 2 by a hitherto known film formation method such as a wet plating method, a deposition method, a sputtering method or the like. While the thickness of the metallic conductive films 3 is not particularly limited, the metallic conductive films 3 desirably have such a thickness as to be continuous film so that a potential from the leads 4 is equally applied to the electrode films 2.

Figure 4A:
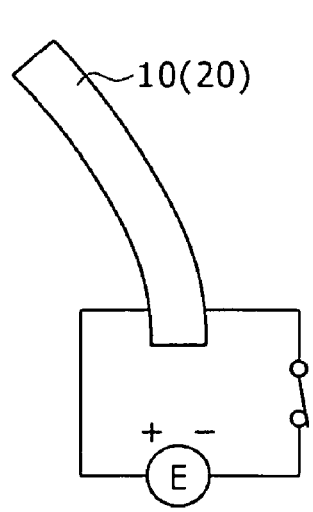
FIGS. 4A to 4C are diagrams of assistance in explaining operation of the polymer actuator elements.
Figure 4B:
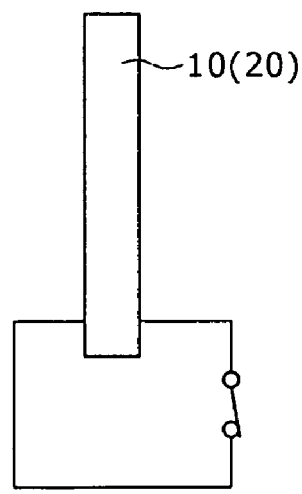
Figure 4C:
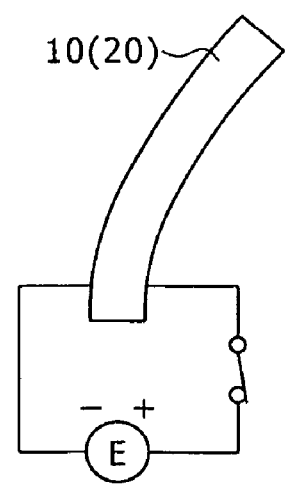

FIGS. 4A, 4B, and 4C represent principles of operation of the polymer actuator elements 10 and 20. Description in the following will be made supposing that the ion conductive polymer film 1 is impregnated with sodium ions.

In FIG. 4A, a positive potential is applied from a power source E to the electrode film 2 of the polymer actuator element 10 on a left side in the figure through the lead 4, and a negative potential is applied from the power source E to the electrode film 2 of the polymer actuator element 10 on a right side in the figure through the lead 4. A difference between the potentials (for example about 0.5 to 1.5 V) causes sodium ion hydrate in the ion conductive polymer film 1 of the polymer actuator element 10 (20) to be attracted and move to the electrode film 2 on the side where the negative potential is applied (right side in the figure), and concentrate in the vicinity of the electrode film 2, so that cubical expansion occurs in this region. On the other hand, the concentration of sodium hydrate in the vicinity of the electrode film 2 on the side where the positive potential is applied (left side in the figure) is decreased, so that cubical contraction occurs in this region. As a result, a difference in volume occurs between the regions of the ion conductive polymer film 1 in the vicinity of the two electrode films 2. The ion conductive polymer film 1 is thus bent to the left side in the figure. Incidentally, when a charge accumulated in the regions in the vicinity of the two electrode films 2 is retained without being moved after the ion conductive polymer film 1 is bent, the bent state is maintained without particular power being used.

In FIG. 4B, the two electrode films 2 are connected to each other in a short-circuited state, and thus a discharge occurs according to the charge accumulated in the regions in the vicinity of the two electrode films 2. As a result, a difference in potential between the two electrode films 2 disappears. Therefore a difference in volume between the regions of the ion conductive polymer film 1 in the vicinity of the two electrode films 2 disappears. The ion conductive polymer film 1 is thus set in the state of an initial shape (a straight state in this case).

In FIG. 4C, a negative potential is applied from the power source E to the electrode film 2 of the polymer actuator element 10 (20) on a left side in the figure through the lead 4, and a positive potential is applied from the power source E to the electrode film 2 of the polymer actuator element 10 (20) on a right side in the figure through the lead 4. A voltage applying method is opposite to that of FIG. 4A. This potential difference causes cubical expansion of a region on the side where the negative potential is applied (left side in the figure) and cubical contraction of a region on the side where the positive potential is applied (right side in the figure) in the ion conductive polymer film 1 of the polymer actuator element 10 (20). As a result, the ion conductive polymer film 1 is bent to the right side in the figure.

An amount of displacement obtained by the bending of the polymer actuator element 10 as described above can be controlled by the applied voltage, and repeatability thereof is good.

Incidentally, supposing that the ion conductive polymer film 1 in the form of one oblong strip and the two electrode films 2 provided on both sides of the ion conductive polymer film 1 are one set, description so far has been made of the polymer actuator element 10 formed by the constitution of one set (unit polymer actuator). However, the polymer actuator element 10 is not limited to this. For example, the polymer actuator element 10 may be formed by laminating, in a direction of thickness, a plurality of sets of unit polymer actuators smaller in thickness than the unit polymer actuator used as the polymer actuator element 10 of the above-described one-set configuration. In this case, although the thickness of the whole of the polymer actuator element 10 is the same as the thickness of the polymer actuator element 10 of the above-described one-set configuration (for example 300 to 500 μm), the polymer actuator element 10 responds to voltage application more quickly and has higher output torque than the polymer actuator element 10 of the above-described one-set configuration.

In addition, while description has been made supposing that the polymer actuator elements 10a, 10b, 10c, and 10d are in the shape of an oblong strip, the shape of the polymer actuator elements 10a, 10b, 10c, and 10d is not particularly limited as long as the polymer actuator elements 10a, 10b, 10c, and 10d have a certain length, and a displacement (bend) due to voltage application of one end part in the direction of length with respect to the other end part can be transmitted to an object (optical element 11). Specifically, for example, a principal plane may be a triangle, an oval, or an indeterminate shape partially cut so as not to be in contact with another peripheral part.

Figure 5B:
FIGS. 5A to 5C are top views showing states of driving of the optical element module of FIG. 1.
Figure 5B:
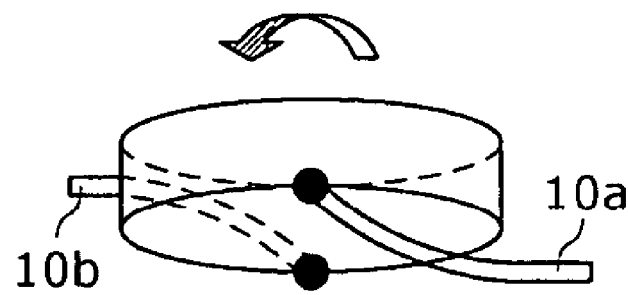
Figure 5A:
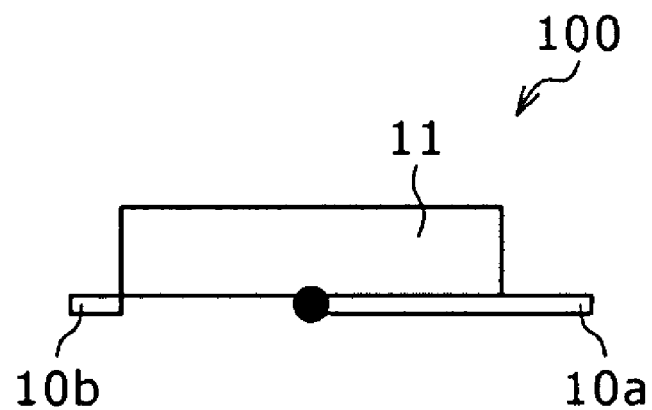
Figure 5C:
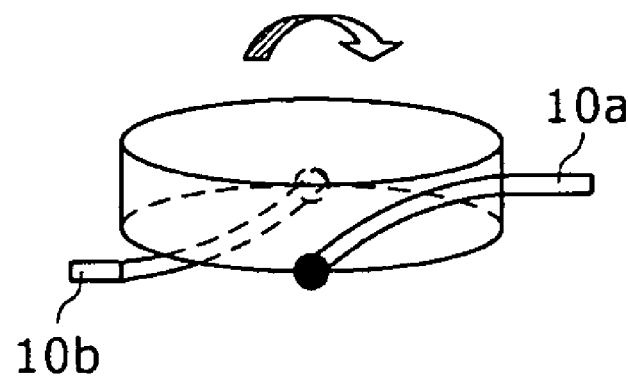

FIGS. 5A, 5B, and 5C show states of tilt driving when the optical element module 100 is viewed from a direction of an arrow in FIG. 1A. FIG. 5A shows an initial state in which no voltage is applied to the polymer actuator elements 10a to 10d. With the optical axis in this state as a reference (0°), suppose that α is an angle when a bend due to voltage application in the polymer actuator elements 10a and 10b tilts the optical element 11, and that β is an angle when a bend due to voltage application in the polymer actuator elements 10c and 10d tilts the optical element 11. The polymer actuator elements 10c and 10d are omitted in FIGS. 5A to 5C.

The optical element module 100 can bend one or both of the polymer actuator elements 10a and 10b by applying voltage to one or both of the polymer actuator elements 10a and 10b, and tilt the optical element 11 in one direction of the α-direction by the pushing or pulling of one end part of the polymer actuator elements 10a and 10b. In addition, the optical element module 100 can bend one or both of the polymer actuator elements 10c and 10d by applying voltage to one or both of the polymer actuator elements 10c and 10d, and tilt the optical element 11 in one direction of the β-direction by the pushing or pulling of one end part of the polymer actuator elements 10c and 10d.

Specifically, the operation of tilting the optical element 11 in the α-direction is performed as follows.

(1) Operation 1 (FIG. 5B)

One or both of the following operations 1a and 1b are performed to tilt the optical element 11 in an α(+) direction (right direction in FIG. 1A).

(Operation 1a) The polymer actuator element 10a is bent in a direction from the bottom surface to the top of the optical element 11 (in an upward direction in FIG. 5A) by applying voltage, so that one end part of the polymer actuator element 10a pushes the optical element 11 in the upward direction.

(Operation 1b) The polymer actuator element 10b is bent in a downward direction from the bottom surface of the optical element 11 (in a downward direction in FIG. 5A) by applying voltage, so that one end part of the polymer actuator element 10b pulls the optical element 11 in the downward direction.

(2) Operation 2 (FIG. 5C)

One or both of the following operations 2a and 2b are performed to tilt the optical element 11 in an α(−) direction (left direction in FIG. 1A).

(Operation 2a) The polymer actuator element 10b is bent in a direction from the bottom surface to the top of the optical element 11 (in an upward direction in FIG. 5A) by applying voltage, so that one end part of the polymer actuator element 10b pushes the optical element 11 in the upward direction.

(Operation 2b) The polymer actuator element 10a is bent in a downward direction from the bottom surface of the optical element 11 (in a downward direction in FIG. 5A) by applying voltage, so that one end part of the polymer actuator element 10a pulls the optical element 11 in the downward direction.

The operation of tilting the optical element 11 in the β-direction is performed as follows.

(3) Operation 3

One or both of the following operations 3a and 3b are performed to tilt the optical element 11 in a β(+) direction (upward direction in FIG. 1A).

(Operation 3a) The polymer actuator element 10d is bent in a direction from the bottom surface to the top of the optical element 11 (in an upward direction in FIG. 1B) by applying voltage, so that one end part of the polymer actuator element 10d pushes the optical element 11 in the upward direction.

(Operation 3b) The polymer actuator element 10c is bent in a downward direction from the bottom surface of the optical element 11 (in a downward direction in FIG. 1B) by applying voltage, so that one end part of the polymer actuator element 10c pulls the optical element 11 in the downward direction.

(4) Operation 4

One or both of the following operations 4a and 4b are performed to tilt the optical element 11 in a β(−) direction (downward direction in FIG. 1A).

(Operation 4a) The polymer actuator element 10c is bent in a direction from the bottom surface to the top of the optical element 11 (in an upward direction in FIG. 1B) by applying voltage, so that one end part of the polymer actuator element 10c pushes the optical element 11 in the upward direction.

(Operation 4b) The polymer actuator element 10d is bent in a downward direction from the bottom surface of the optical element 11 (in a downward direction in FIG. 1B) by applying voltage, so that one end part of the polymer actuator element 10d pulls the optical element 11 in the downward direction.

In actual driving, by combining the above-described operations 1 to 4 as appropriate (a single operation of one of the operations 1 to 4 or a combined operation of the operation 1 or 2 and the operation 3 or 4), the optical axis of the optical element 11 can be tilted at an arbitrary angle with respect to the optical axis in the initial state of the optical element 11.

In addition, when all of the polymer actuator elements 10a to 10d are bent in the direction from the bottom surface to the top of the optical element 11 (in the upward direction in FIG. 1B) by applying voltage, one end part of each of the polymer actuator elements 10a to 10d pushes the optical element 11 in the upward direction, and thus the optical element 11 can be translated upward in the direction of the optical axis in the initial state.

Description will next be made of a second embodiment of an optical element module according to the present application.

Figure 6A:
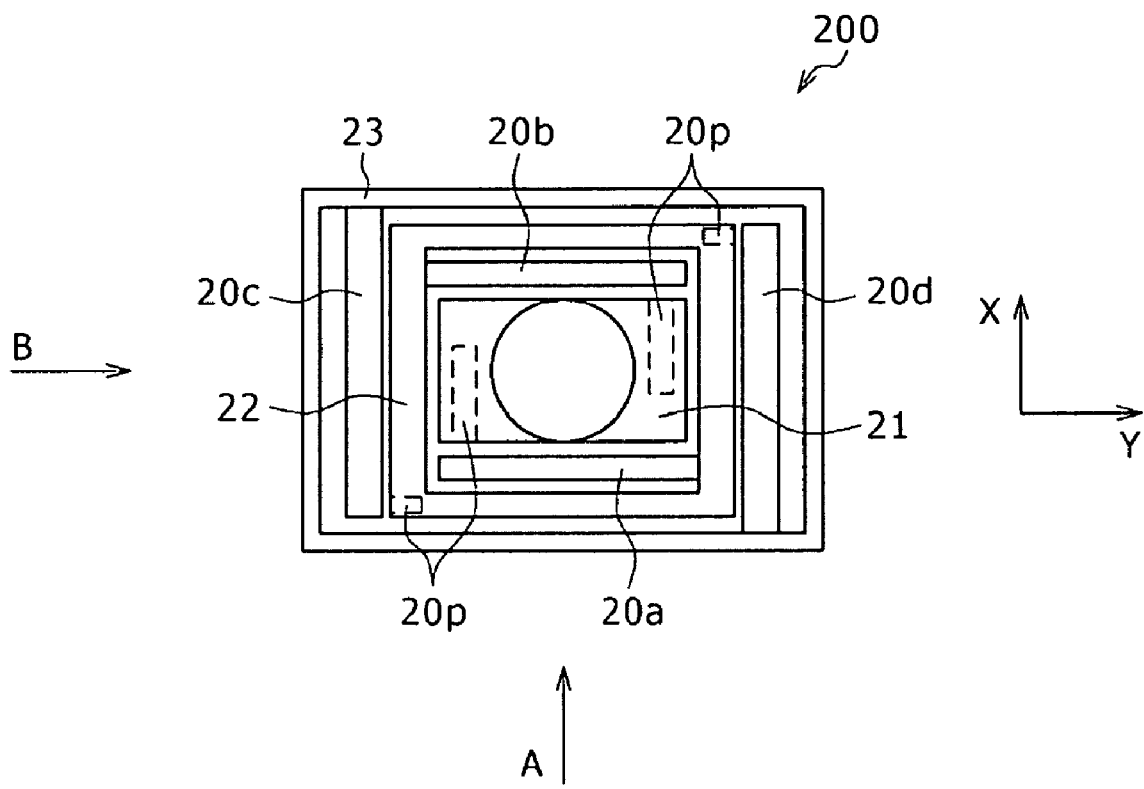
FIGS. 6A and 6B are schematic diagrams showing a constitution of a second embodiment of an optical element module.
Figure 6B:
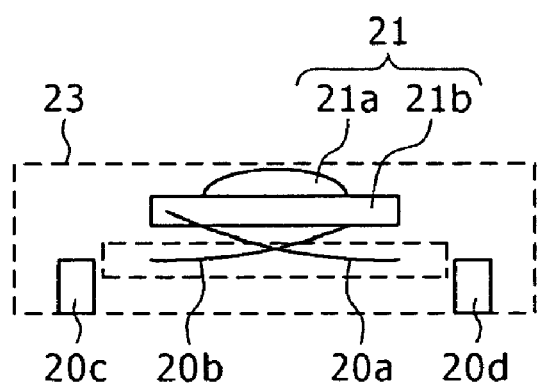

FIGS. 6A and 6B are schematic diagrams showing a constitution of a second embodiment of an optical element module according to an embodiment. FIG. 6A is a front view of an optical element module 200 as viewed from above along the optical axis of an optical element. FIG. 6B is a side view of the optical element module 200.

The optical element module 200 has an inner frame 22 containing an optical element 21 and an outer frame 23 containing the inner frame 22 together with the optical element 21. In addition, the optical element module 200 has, as a plurality of actuator elements, four actuator elements 20a, 20b, 20c, and 20d in the shape of an oblong strip which actuator elements have a same configuration as the above-described polymer actuator element 10. Of the four actuator elements 20a, 20b, 20c, and 20d, two actuator elements 20a and 20b are arranged within the inner frame 22 so as to be in a point-symmetric relation to each other with respect to the optical axis of the optical element 21 with the optical element 21 interposed between the two actuator elements 20a and 20b in one direction (X-direction) on a plane perpendicular to the optical axis of the optical element 21 (XY plane). The other two actuator elements 20c and 20d are arranged within the outer frame 23 so as to be in a point-symmetric relation to each other with respect to the optical axis with the inner frame 22 and the optical element 21 interposed between the two actuator elements 20c and 20d in a direction (Y-direction) orthogonal to the X-direction.

The optical element 21 in this case includes a lens 21a and a box-shaped lens holder 21b having a hole that penetrates in the direction of the optical axis of the lens 21a and retains the lens 21a. In addition, two sides of the lens holder 21b which sides are opposed to each other in the X-direction are provided with holes extending in the X-direction into which holes arm members 20p fixed to the respective polymer actuator elements 20a and 20b are inserted. Incidentally, in addition to this constitution, the optical element 21 may be a light receiving element such as a CCD or the like.

The inner frame 22 is a case made of a resin or made of a metal which case contains the box-shaped optical element 21 and the polymer actuator elements 20a and 20b. One end part of each of the polymer actuator elements 20a and 20b is coupled to the side of the optical element 21 via the bar-shaped arm member 20p such that a displacement based on a bend in the polymer actuator elements 20a and 20b due to voltage application can be transmitted to the side of the optical element 21. Another end part of the polymer actuator elements 20a and 20b is fixed to the inner wall of the inner frame 22. In addition, two sides of the outer wall of the inner frame which sides are opposed to each other in the Y-direction are provided with holes extending in the Y-direction into which holes arm members 20p fixed to the respective polymer actuator elements 20c and 20d are inserted.

The outer frame 23 is a case made of a resin or made of a metal which case contains the inner frame 22 (including the optical element 21 and the polymer actuator elements 20a and 20b) and the polymer actuator elements 20c and 20d. One end part of each of the polymer actuator elements 20c and 20d is coupled to the outer wall of the inner frame 22 via the bar-shaped arm member 20p such that a displacement based on a bend in the polymer actuator elements 20c and 20d due to voltage application can be transmitted to the outer wall of the inner frame 22. Another end part of the polymer actuator elements 20c and 20d is fixed to the inner wall of the outer frame 23.

In the optical element module 200 assembled as the above-described constitution, the polymer actuator elements 20a, 20b, 20c, and 20d to which no voltage is applied are in a state as of a leaf spring. Thus, the polymer actuator elements 20a, 20b, 20c, and 20d to which no voltage is applied are in an initial state shown in FIG. 6A, that is, the optical element 21 is retained such that the optical axis of the optical element 21 is the vertical direction of the optical element module 200. Alternatively, the position of the optical element 21 and the inner frame 22 may be regulated by adding a separate leaf spring or the like. In addition, smoother operation is made possible by providing a space by disposing a spacer between the optical element 21 and the polymer actuator elements 20a and 20b and between the inner frame 22 and the polymer actuator elements 20c and 20d, or lengthening the arm members 20p.

Incidentally, the arm members 20p in the shape of a round bar or in the shape of a pin are fixed to the respective polymer actuator elements 20a, 20b, 20c, and 20d in a state of being upright from one end of the polymer actuator elements 20a, 20b, 20c, and 20d so as to form a right angle with the length of the polymer actuator elements. As described above, the arm members 20p of the polymer actuator elements 20a and 20b are inserted into the holes provided in the sides of the optical element 21. The polymer actuator elements 20a and 20b and the optical element 21 are thereby coupled to each other. The arm members 20p of the polymer actuator elements 20c and 20d are inserted into the holes provided in the outer wall of the inner frame 22. The polymer actuator elements 20c and 20d and the inner frame 22 are thereby coupled to each other. Incidentally, these holes are not fixed to the arm members 20p, but are in a state of being slidable in the direction of an outer circumference (circumference) of the arm members 20p. Thus, when a polymer actuator element is bent, the displacement is transmitted to the object (the optical element 21 and the inner frame 22) coupled via an arm member 20p to change the position of the object, and the object rotates on the arm member 20p.

Incidentally, while description has been made supposing that the polymer actuator elements 20a, 20b, 20c, and 20d are in the shape of an oblong strip, the shape of the polymer actuator elements 20a, 20b, 20c, and 20d is not particularly limited as long as the polymer actuator elements 20a, 20b, 20c, and 20d have a certain length, and a displacement (bend) due to voltage application of one end part in the direction of length with respect to the other end part can be transmitted to the object (the optical element 21 and the inner frame 22) via the arm members 20p. Specifically, for example, a principal plane may be a triangle, an oval, or an indeterminate shape partially cut so as not to be in contact with another peripheral part.

Figure 7B:
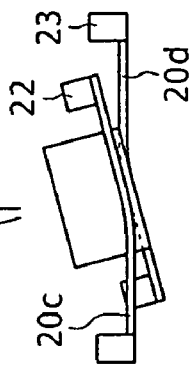
FIGS. 7A to 7E are side views showing states of tilt driving of the optical element module of FIGS. 6A and 6B.
Figure 7A:
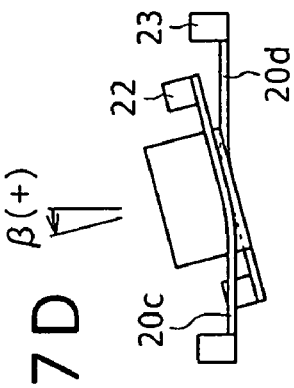
Figure 7C:
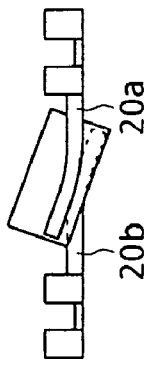
Figure 7D:
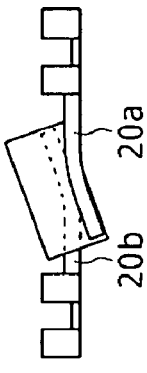
Figure 7E:
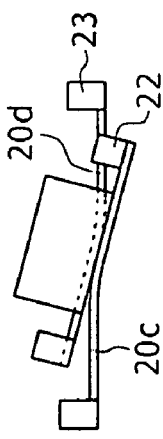

FIGS. 7A to 7E show states of tilt driving of the optical element module 200. FIGS. 7A to 7C show states of driving when the optical element module 200 is viewed from the direction of an arrow A in FIG. 6A. FIGS. 7D and 7E show states of driving when the optical element module 200 is viewed from the direction of an arrow B in FIG. 6A. FIG. 7A shows an initial state in which no voltage is applied to the polymer actuator elements 20a to 20d. With the optical axis in this state as a reference (0°), suppose that $\alpha$ is an angle when a bend due to voltage application in the polymer actuator elements 20a and 20b tilts the optical element 21, and that $\beta$ is an angle when a bend due to voltage application in the polymer actuator elements 20c and 20d tilts the optical element 21.

The optical element module 200 can bend one or both of the polymer actuator elements 20a and 20b by applying voltage to one or both of the polymer actuator elements 20a and 20b, and tilt the optical element 21 in one direction of the $\alpha$-direction by the pushing or pulling of one end part of the polymer actuator elements 20a and 20b. In addition, the optical element module 200 can bend one or both of the polymer actuator elements 20c and 20d by applying voltage to one or both of the polymer actuator elements 20c and 20d, and tilt the optical element 21 in one direction of the $\beta$-direction by the pushing or pulling of one end part of the polymer actuator elements 20c and 20d.

Specifically, the operation of tilting the optical element 21 in the $\alpha$-direction is performed as follows.

(1) Operation 1 (FIG. 7B)

One or both of the following operations 1a and 1b are performed to tilt the optical element 21 in an $\alpha(+)$ direction (right direction in FIG. 6A).

(Operation 1a) The polymer actuator element 20a is bent in a direction from the bottom surface to the top of the optical element 21 (in an upward direction in FIG. 7A) by applying voltage, so that one end part of the polymer actuator element 20a pushes the optical element 21 in the upward direction.

(Operation 1b) The polymer actuator element 20b is bent in a downward direction from the bottom surface of the optical element 21 (in a downward direction in FIG. 7A) by applying voltage, so that one end part of the polymer actuator element 20b pulls the optical element 21 in the downward direction.

(2) Operation 2 (FIG. 7C)

One or both of the following operations 2a and 2b are performed to tilt the optical element 21 in an $\alpha(-)$ direction (left direction in FIG. 6A).

(Operation 2a) The polymer actuator element 20b is bent in a direction from the bottom surface to the top of the optical element 21 (in an upward direction in FIG. 7A) by applying voltage, so that one end part of the polymer actuator element 20b pushes the optical element 21 in the upward direction.

(Operation 2b) The polymer actuator element 20a is bent in a downward direction from the bottom surface of the optical element 21 (in a downward direction in FIG. 7A) by applying voltage, so that one end part of the polymer actuator element 20a pulls the optical element 21 in the downward direction.

The operation of tilting the optical element 21 in the β-direction is performed as follows.

(3) Operation 3 (FIG. 7D)

One or both of the following operations 3a and 3b are performed to tilt the optical element 21 in a β(+) direction (upward direction in FIG. 6A).

(Operation 3a) The polymer actuator element 20c is bent in a direction from the bottom surface to the top of the optical element 21 (in an upward direction in FIG. 7D) by applying voltage, so that one end part of the polymer actuator element 20c pushes the optical element 21 in the upward direction.

(Operation 3b) The polymer actuator element 20d is bent in a downward direction from the bottom surface of the optical element 21 (in a downward direction in FIG. 7D) by applying voltage, so that one end part of the polymer actuator element 20d pulls the optical element 21 in the downward direction.

(4) Operation 4 (FIG. 7E)

One or both of the following operations 4a and 4b are performed to tilt the optical element 21 in a β(−) direction (downward direction in FIG. 6A).

(Operation 4a) The polymer actuator element 20d is bent in a direction from the bottom surface to the top of the optical element 21 (in an upward direction in FIG. 7E) by applying voltage, so that one end part of the polymer actuator element 20d pushes the optical element 21 in the upward direction.

(Operation 4b) The polymer actuator element 20c is bent in a downward direction from the bottom surface of the optical element 21 (in a downward direction in FIG. 7E) by applying voltage, so that one end part of the polymer actuator element 20c pulls the optical element 21 in the downward direction.

In actual driving, by combining the above-described operations 1 to 4 as appropriate (a single operation of one of the operations 1 to 4 or a combined operation of the operation 1 or 2 and the operation 3 or 4), the optical axis of the optical element 21 can be tilted at an arbitrary angle with respect to the optical axis in the initial state of the optical element 21.

Figure 8C:
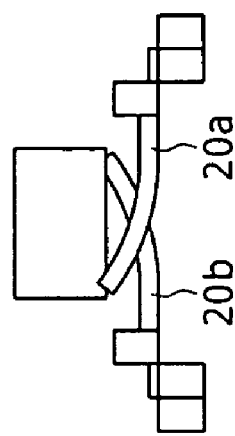
FIGS. 8A to 8C are side views showing states of movement in an axial direction of an optical element in the optical element module of FIGS. 6A and 6B.
Figure 8B:
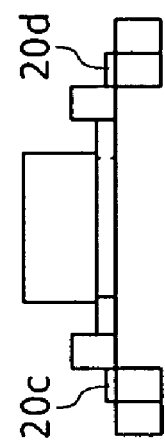
Figure 8A:
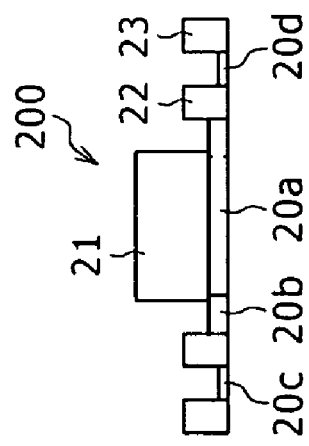

FIGS. 8A to 8C show states of movement in the direction of the axis of the optical element 21 in the optical element module 200. When the polymer actuator elements 20c and 20d are bent in the direction from the bottom surface to the top of the optical element 21 (in the upward direction in FIG. 8A) by a same amount of displacement by applying voltage, one end part of the polymer actuator elements 20c and 20d pushes the optical element 21 in the upward direction via the arm members 20p, and thus the optical element 21 can be translated upward in the direction of the optical axis in the initial state (FIG. 8B). When all of the polymer actuator elements 20a to 20d are bent in the direction from the bottom surface to the top of the optical element 21 (in the upward direction in FIG. 8A) by a same amount of displacement by applying voltage, one end part of all of the polymer actuator elements 20a to 20d pushes the optical element 21 in the upward direction via the arm members 20p, and thus the optical element 21 can be translated further upward in the direction of the optical axis in the initial state (FIG. 8C).

Description will next be made of a third embodiment of an optical element module.

Figure 9A:
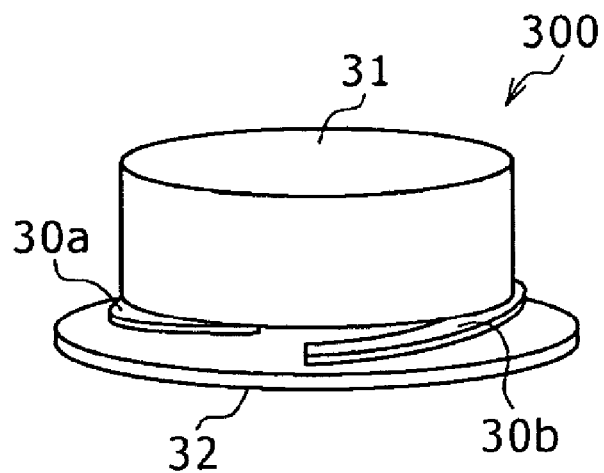
FIGS. 9A and 9B are schematic diagrams showing a constitution of a third embodiment of an optical element module.
Figure 9B:
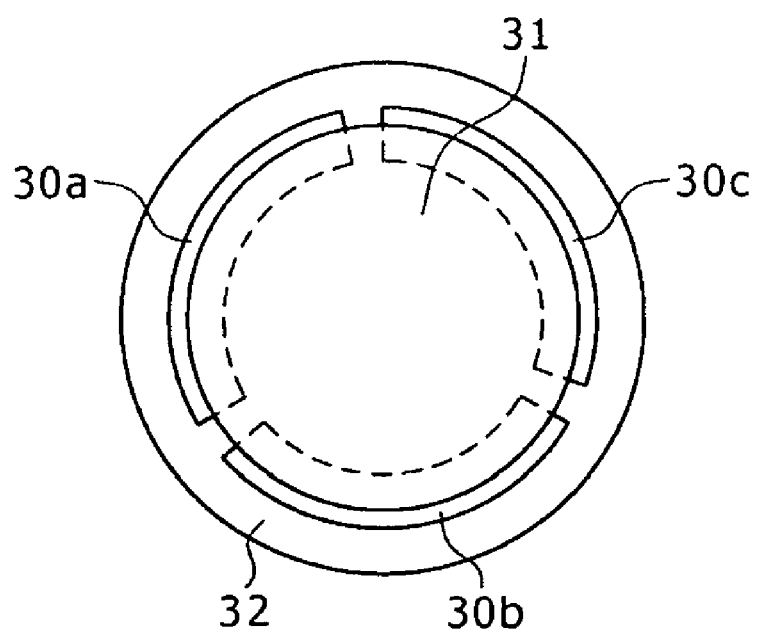

FIGS. 9A and 9B are schematic diagrams showing a constitution of the third embodiment of an optical element module. FIG. 9A is a perspective view of an optical element module 300. FIG. 9B is a front view of the optical element module 300 as viewed from above along the optical axis of an optical element.

The optical element module 300 includes an optical element 31, three polymer actuator elements 30a, 30b, and 30c or more, and a flat-shaped base 32 mounted with the optical element 31 and the polymer actuator elements 30a, 30b, and 30c.

The optical element 31 in this case is a lens, a lens and a lens holder, or a light receiving element such as a CCD or the like. FIGS. 9A and 9B show the optical element 31 formed by a single lens. The base 32 is a doughnut-shaped disk having a through hole at a center. Another end part of each of the polymer actuator elements 30a, 30b, and 30c is fixed to the base 32. The base 32 has sufficient stiffness to support at least the polymer actuator elements 30a, 30b, and 30c and the optical element 31.

The polymer actuator elements 30a, 30b, and 30c are oblong strip-shaped actuator elements having the same constitution as the above-described polymer actuator element 10. The polymer actuator elements 30a, 30b, and 30c are arranged between the bottom surface of the optical element 31 and the base 32, and are arranged at equal intervals in the direction of length of the polymer actuator elements 30a, 30b, and 30c along a circumference having the optical axis of the optical element 31 as a center thereof. At this time, the direction of length of the polymer actuator elements 30a, 30b, and 30c is bent along the circumference. In addition, one end part of each of the polymer actuator elements 30a, 30b, and 30c is fixed to the bottom surface of the optical element 31, and the other end part of each of the polymer actuator elements 30a, 30b, and 30c is fixed to the base 32. Further, when one of end parts adjacent to each other of adjoining polymer actuator elements is fixed to the bottom surface of the optical element 31, the other is fixed to the base 32. The one end part of each of the polymer actuator elements 30a, 30b, and 30c is displaced in the direction of thickness thereof, that is, in the direction of the optical axis of the optical element 31 by voltage application.

In the optical element module 300 assembled as the above-described constitution, the polymer actuator elements 30a, 30b, and 30c to which no voltage is applied are in a state of a flat plate. Thus, the polymer actuator elements 30a, 30b, and 30c to which no voltage is applied are in an initial state shown in FIG. 10A, that is, the optical axis of the optical element 31 is the vertical direction of the optical element module 300. Alternatively, the position of the optical element 31 may be regulated by adding a separate leaf spring or the like. In addition, although there is less optical effect when the polymer actuator elements 30a, 30b, and 30c are fixed on the outside of the optical element 31, when there is an actually unused area, the polymer actuator elements 30a, 30b, and 30c may be fixed on the inside of the optical element 31 in a region where no effect is produced. In addition, smoother operation is made possible by providing a space by a spacer or an arm to the coupling parts where the optical element 31 is coupled to the polymer actuator elements 30a, 30b, and 30c.

In addition, while description has been made supposing that the polymer actuator elements 30a, 30b, and 30c are in the shape of an oblong strip, the shape of the polymer actuator elements 30a, 30b, and 30c is not particularly limited as long as the polymer actuator elements 30a, 30b, and 30c have a certain length, and a displacement (bend) due to voltage application of one end part in the direction of length with respect to the other end part can be transmitted to an object (optical element 31). Specifically, for example, a principal plane may be a triangle, an oval, or an indeterminate shape partially cut so as not to be in contact with another peripheral part.

Figure 10A:
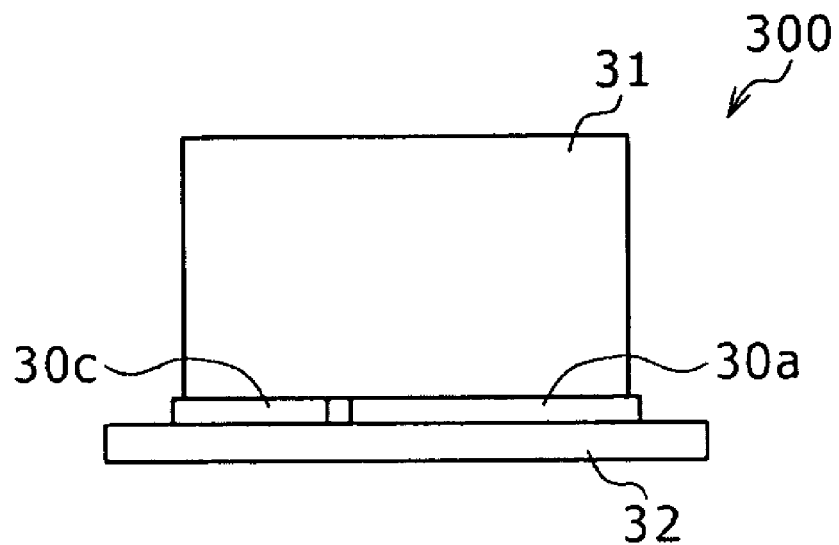
FIGS. 10A and 10B are side views showing states of tilt driving of the optical element module of FIGS. 9A and 9B.
Figure 10B:
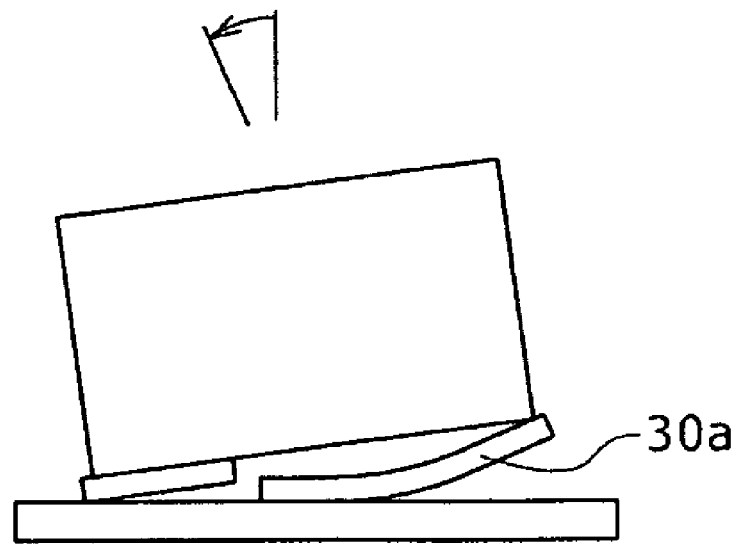

FIGS. 10A and 10B show states of tilt driving of the optical element module 300.

When a predetermined voltage is applied to the polymer actuator element 30a in the initial state of FIG. 10A, one end part is bent in a direction from the bottom surface to the top of the optical element 31 (in an upward direction in FIG. 10A) with respect to the other end part fixed to the base 32, so that one end part of the polymer actuator element 30a pushes the bottom surface of the optical element 31 in the upward direction. Thereby, the optical element 31 is tilted at a predetermined angle in a predetermined direction (FIG. 10B). By thus bending one or two of the polymer actuator elements 30a, 30b, and 30c as appropriate, the optical axis of the optical element 31 can be tilted at an arbitrary angle with respect to the optical axis in the initial state of the optical element 31.

Figure 11A:
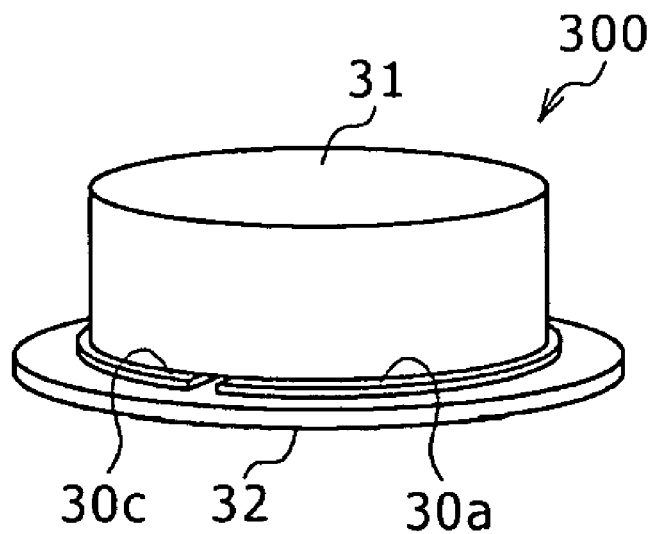
FIGS. 11A and 11B are perspective views showing states of movement in an axial direction of an optical element in the optical element module of FIGS. 9A and 9B.
Figure 11B:
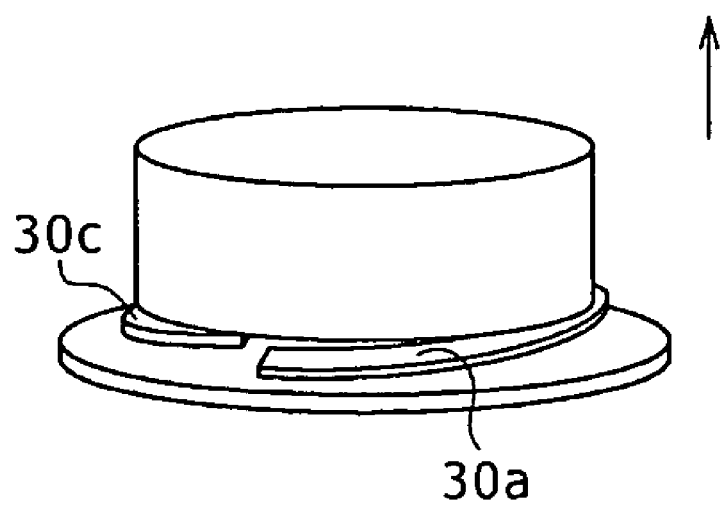

FIGS. 11A and 11B show states of movement in the direction of the axis of the optical element 31 in the optical element module 300. When all of the polymer actuator elements 30a, 30b, and 30c are bent in the direction from the bottom surface to the top of the optical element 31 (in an upward direction in FIG. 11A) by a same amount of displacement by applying voltage, one end part of all of the polymer actuator elements 30a, 30b, and 30c pushes the optical element 31 in the upward direction, and thus the optical element 31 can be translated upward in the direction of the optical axis in the initial state (FIG. 11B).

Description will next be made of a fourth embodiment of an optical element module.

Figure 12A:
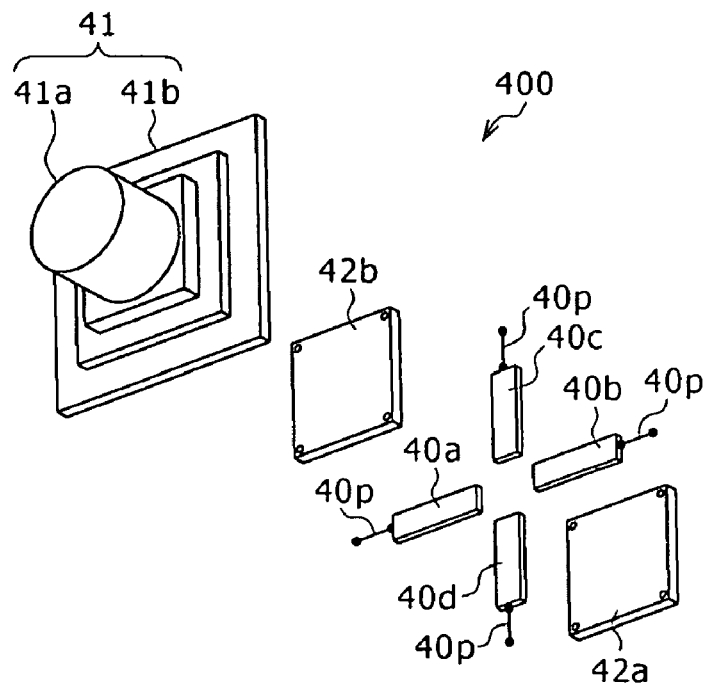
FIGS. 12A to 12C are schematic diagrams showing a constitution of a fourth embodiment of an optical element module.
Figure 12B:
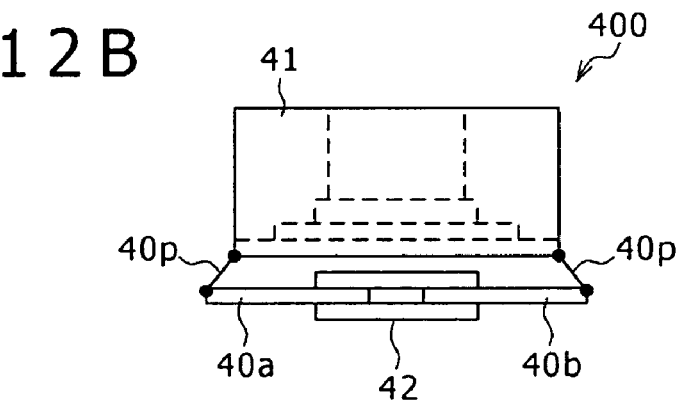
Figure 12C:
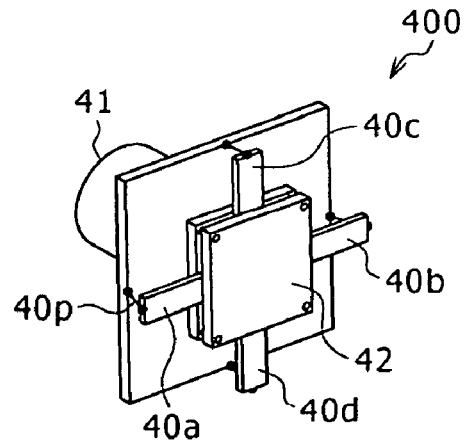

FIGS. 12A to 12C are schematic diagrams showing a constitution of a fourth embodiment of an optical element module. FIG. 12A is an exploded view of an optical element module 400. FIG. 12B is a side view of the optical element module 400. FIG. 12C is a perspective view of the optical element module 400 as viewed from the back side of the optical element module 400.

The optical element module 400 includes an optical element 41, a plurality of polymer actuator elements 40a, 40b, 40c, and 40d, and a base 42 mounted with the polymer actuator elements 40a, 40b, 40c, and 40d.

The optical element 41 in this case is a combination of a lens, a lens holder, and a light receiving element such as a CCD or the like. FIGS. 12A to 12C show the optical element 41 formed by a combination of a lens 41a and a light receiving element 41b. The base 42 is formed by flat-shaped base members 42a and 42b that retain the polymer actuator elements 40a, 40b, 40c, and 40d such that another end part of each of the polymer actuator elements 40a, 40b, 40c, and 40d is sandwiched between the base members 42a and 42b.

The polymer actuator elements 40a, 40b, 40c, and 40d are oblong strip-shaped actuator elements having the same constitution as the above-described polymer actuator element 10, and are four oblong strip-shaped actuator elements arranged on the bottom surface side of the optical element 41. The polymer actuator elements 40a, 40b, 40c, and 40d are arranged such that the directions of length of the polymer actuator elements 40a, 40b, 40c, and 40d are directions of radiating from the optical axis center of the optical element 41 and such that polymer actuator elements adjacent to each other form an angle of 90°. One end part of each of the polymer actuator elements 40a, 40b, 40c, and 40d is coupled to each of four sides of the rectangular bottom surface of the optical element 41 via arm members 40p so as to be able to transmit a displacement to each of the four sides of the rectangular bottom surface of the optical element 41. The other end part of each of the polymer actuator elements 40a, 40b, 40c, and 40d is fixed to the base 42. Incidentally, a junction part of the one end part and an arm member 40p and a junction part of the arm member 40p and the optical element 41 may be completely fixed, but may also be of a structure such that the one end part and the arm member 40p are freely rotatable with respect to each other and the arm member 40p and the optical element 41 are freely rotatable with respect to each other. It is desirable that as the structure allowing the free rotation, a universal joint be used at the junction parts, for example, or the arm members 40p be a ball point arm structure. Alternatively, the junction parts may be formed via a flexible leaf spring or a plastic film.

In the optical element module 400 assembled as the above-described constitution, the polymer actuator elements 40a, 40b, 40c, and 40d to which no voltage is applied are in a state as of a leaf spring. Thus, the polymer actuator elements 10a, 10b, 10c, and 10d to which no voltage is applied are in an initial state shown in FIG. 12B, that is, the optical element 41 is retained such that the optical axis of the optical element 41 is the vertical direction of the optical element module 400. Alternatively, the position of the optical element 41 may be regulated by adding a separate leaf spring or the like.

In addition, while description has been made supposing that the polymer actuator elements 40a, 40b, 40c, and 40d are in the shape of an oblong strip, the shape of the polymer actuator elements 40a, 40b, 40c, and 40d is not particularly limited as long as the polymer actuator elements 40a, 40b, 40c, and 40d have a certain length, and a displacement (bend) due to voltage application of one end part in the direction of length with respect to the other end part can be transmitted to an object (optical element 41) via the arm member 40p. Specifically, for example, a principal plane may be a triangle, an oval, or an indeterminate shape partially cut so as not to be in contact with another peripheral part.

Figure 13A:
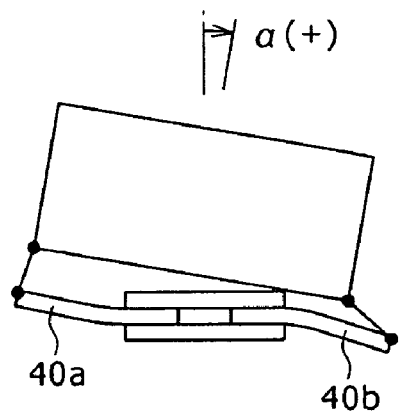
FIGS. 13A to 13C are side views showing states of tilt driving of the optical element module of FIGS. 12A to 12C.
Figure 13B:
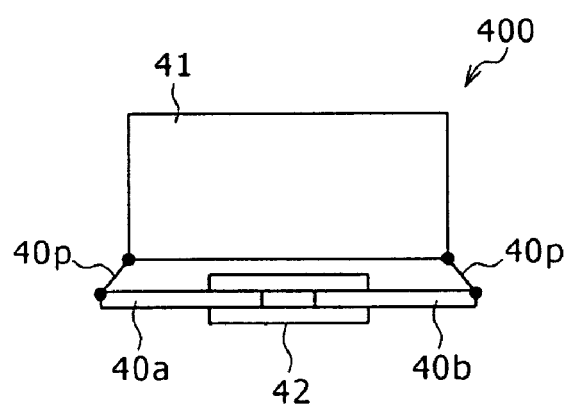
Figure 13C:
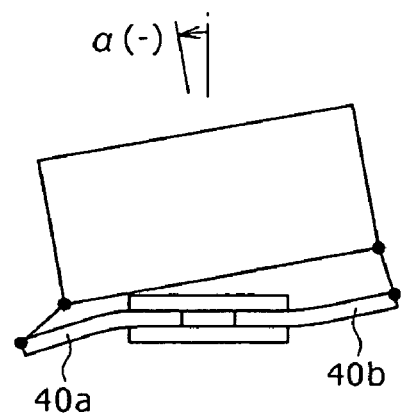

FIGS. 13A to 13C show states of tilt driving of the optical element module 400. FIG. 13A shows an initial state in which no voltage is applied to the polymer actuator elements 40a to 40d. With the optical axis in this state as a reference (0°), suppose that α is an angle when a bend due to voltage application in the polymer actuator elements 40a and 40b tilts the optical element 41, and that β is an angle when a bend due to voltage application in the polymer actuator elements 40c and 40d tilts the optical element 41. The polymer actuator elements 40c and 40d are omitted in FIGS. 13A to 13C.

The optical element module 400 can bend one or both of the polymer actuator elements 40a and 40b by applying voltage to one or both of the polymer actuator elements 40a and 40b, and tilt the optical element 41 in one direction of the α-direction by the pushing or pulling of one end part of the polymer actuator elements 40a and 40b. In addition, the optical element module 400 can bend one or both of the polymer actuator elements 40c and 40d by applying voltage to one or both of the polymer actuator elements 40c and 40d, and tilt the optical element 41 in one direction of the β-direction by the pushing or pulling of one end part of the polymer actuator elements 40c and 40d.

Specifically, the operation of tilting the optical element 41 in the α-direction is performed as follows.

(1) Operation 1 (FIG. 13B)

One or both of the following operations 1a and 1b are performed to tilt the optical element 41 in an α(+) direction (right direction in FIG. 13A).

(Operation 1a) The polymer actuator element 40a is bent in a direction from the bottom surface to the top of the optical element 41 (in an upward direction in FIG. 13A) by applying voltage, so that the arm member 40p coupled to one end part of the polymer actuator element 40*a* pushes one side forming the rectangular bottom surface of the optical element 41 in the upward direction.

(Operation 1b) The polymer actuator element 40*b* is bent in a downward direction from the bottom surface of the optical element 41 (in a downward direction in FIG. 13A) by applying voltage, so that the arm member 40*p* coupled to one end part of the polymer actuator element 40*b* pulls one side forming the rectangular bottom surface of the optical element 41 in the downward direction.

(2) Operation 2 (FIG. 13C)

One or both of the following operations 2a and 2b are performed to tilt the optical element 41 in an α(−) direction (left direction in FIG. 13A).

(Operation 2a) The polymer actuator element 40*b* is bent in a direction from the bottom surface to the top of the optical element 41 (in an upward direction in FIG. 13A) by applying voltage, so that the arm member 40*p* coupled to one end part of the polymer actuator element 40*b* pushes one side forming the rectangular bottom surface of the optical element 41 in the upward direction.

(Operation 2b) The polymer actuator element 40*a* is bent in a downward direction from the bottom surface of the optical element 41 (in a downward direction in FIG. 13A) by applying voltage, so that the arm member 40*p* coupled to one end part of the polymer actuator element 40*a* pulls one side forming the rectangular bottom surface of the optical element 41 in the downward direction.

The operation of tilting the optical element 41 in the β-direction is performed as follows.

(3) Operation 3

One or both of the following operations 3a and 3b are performed to tilt the optical element 41 in a β(+) direction (direction of the other side of a paper plane in FIG. 13A).

(Operation 3a) The polymer actuator element 40*d* is bent in a direction from the bottom surface to the top of the optical element 41 (in an upward direction in FIG. 13A) by applying voltage, so that the arm member 40*p* coupled to one end part of the polymer actuator element 40*d* pushes one side forming the rectangular bottom surface of the optical element 41 in the upward direction.

(Operation 3b) The polymer actuator element 40*c* is bent in a downward direction from the bottom surface of the optical element 41 (in a downward direction in FIG. 13A) by applying voltage, so that the arm member 40*p* coupled to one end part of the polymer actuator element 40*c* pulls one side forming the rectangular bottom surface of the optical element 41 in the downward direction.

(4) Operation 4

One or both of the following operations 4a and 4b are performed to tilt the optical element 41 in a β(−) direction (direction of this side of a paper plane in FIG. 13A).

(Operation 4a) The polymer actuator element 40*c* is bent in a direction from the bottom surface to the top of the optical element 41 (in an upward direction in FIG. 13A) by applying voltage, so that the arm member 40*p* coupled to one end part of the polymer actuator element 40*c* pushes one side forming the rectangular bottom surface of the optical element 41 in the upward direction.

(Operation 4b) The polymer actuator element 40*d* is bent in a downward direction from the bottom surface of the optical element 41 (in a downward direction in FIG. 13A) by applying voltage, so that the arm member 40*p* coupled to one end part of the polymer actuator element 40*d* pulls one side forming the rectangular bottom surface of the optical element 41 in the downward direction.

In actual driving, by combining the above-described operations 1 to 4 as appropriate (a single operation of one of the operations 1 to 4 or a combined operation of the operation 1 or 2 and the operation 3 or 4), the optical axis of the optical element 41 can be tilted at an arbitrary angle with respect to the optical axis in the initial state of the optical element 41.

Description will next be made of a fifth embodiment of an optical element module according to the present application.

Figure 14A:
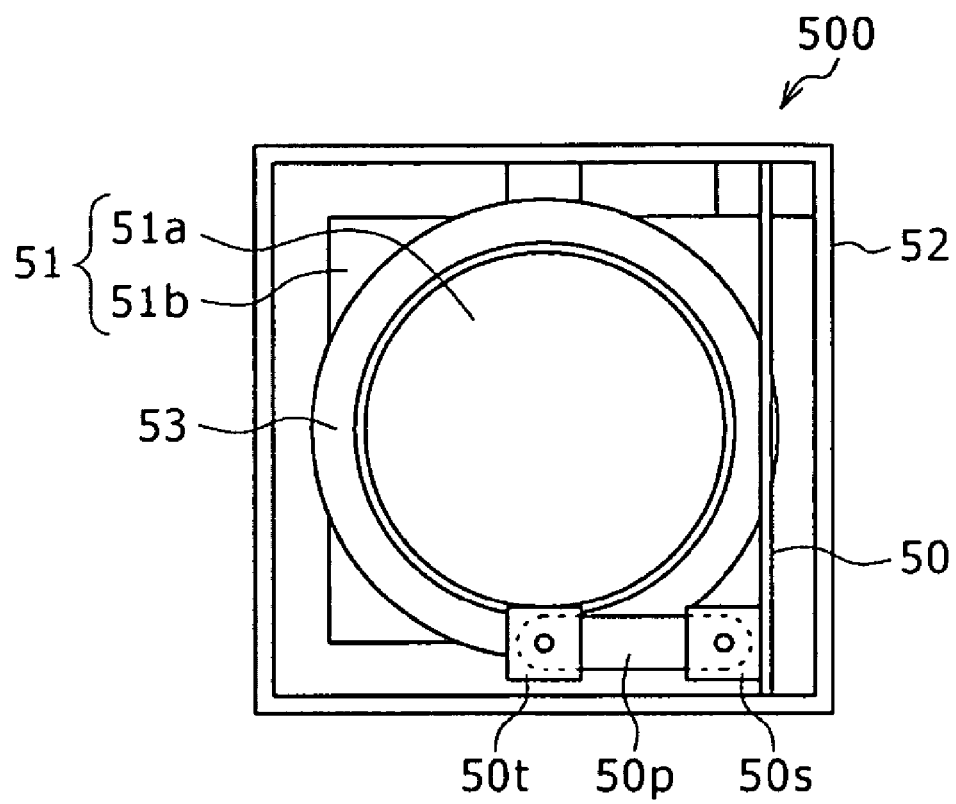
FIGS. 14A and 14B are schematic diagrams showing a constitution of a fifth embodiment of an optical element module.
Figure 14B:
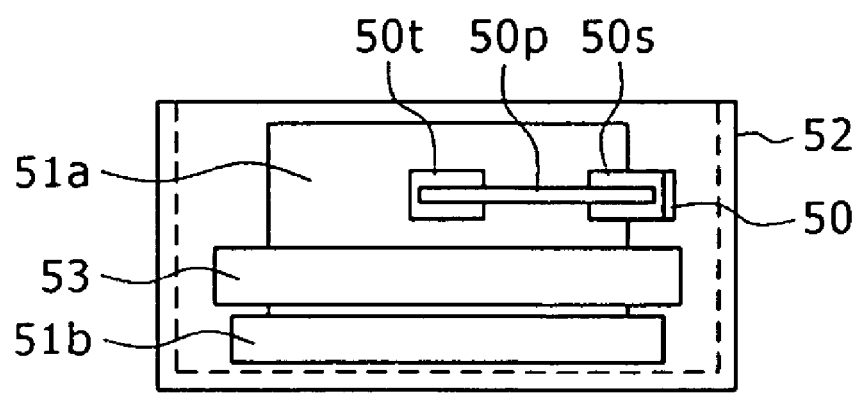

FIGS. 14A and 14B are schematic diagrams showing a constitution of a fifth embodiment of an optical element module according to an embodiment. FIG. 14A is a front view of an optical element module 500 as viewed from above along the optical axis of an optical element. FIG. 14B is a side view of the optical element module 500.

The optical element module 500 includes a polymer actuator element 50, an optical element 51, a fixing frame 52 housing the optical element 51 and the polymer actuator element 50, and a bearing 53 retaining the optical element 51 rotatably around the optical axis of the optical element 51 within the fixing frame 52.

The optical element 51 in this case is formed by coupling a lens 51*a* and a light receiving element 51*b* to each other in the direction of the optical axis. The bearing 53 is disposed on the outer circumference of the lens 51*a*. The inside of the bearing 53 is fixed to the lens 51*a*, and the outside of the bearing 53 is fixed to the inner wall of the fixing frame 52. Thus, when a stress acts in the direction of the circumference of the lens 51*a*, the bearing 53 allows the lens 51*a* and the light receiving element 51*b* to be driven so as to be rotated around the optical axis within the fixing frame 52.

Another end part of the polymer actuator element 50 is fixed to the inner wall of the fixing frame 52. The fixing frame 52 has sufficient stiffness to support at least the polymer actuator element 50 and accessories thereof, the optical element 51, and the bearing 53.

The polymer actuator element 50 is an oblong strip-shaped actuator element having the same constitution as the above-described polymer actuator element 10, and is an oblong strip-shaped actuator element disposed on the side of the lens 51*a*. The polymer actuator element 50 is disposed such that the direction of width of the oblong strip shape is the direction of the optical axis and the direction of thickness of the oblong strip shape is a direction perpendicular to the optical axis. The other end part of the polymer actuator element 50 is fixed to the inner wall of the fixing frame 52 so that one end part of the polymer actuator element 50 in the direction of length thereof is displaced by a bend as described above to effect rotational movement of the optical element 51. In addition, an arm member 50*p* is attached to the one end part of the polymer actuator element 50 via a hinge 50*s*. Further, a hinge 50*t* is attached to an end of the arm member 50*p*. The hinge 50*t* is fixed to the side of the lens 51*a*. At this time, the hinge 50*s* couples the polymer actuator element 50 and the arm member 50*p* to each other, and is of a structure such that the polymer actuator element 50 and the arm member 50*p* are freely rotatable with respect to each other. The hinge 50*t* couples the arm member 50*p* and the lens 51*a* to each other, and is of a structure such that the arm member 50*p* and the lens 51*a* are freely rotatable with respect to each other. With this structure, when the polymer actuator element 50 is bent, the polymer actuator element 50 can push the arm member 50*p* and rotate the lens 51*a* in the direction of the circumference of the lens 51*a*.

Incidentally, the junction part between the one end part of the polymer actuator element 50 and the arm member 50*p* and the junction part between the arm member 50*p* and the lens 51*a* are not limited to the hinge structure. It suffices for the junction parts to be of a structure such that the one end part of the polymer actuator element 50 and the arm member 50p are freely rotatable with respect to each other and the arm member 50p and the lens 51a are freely rotatable with respect to each other, and to be of a structure such that a displacement of the polymer actuator element 50 can be transmitted to the rotation of the lens 51a. It is desirable that a universal joint be used at the junction parts, for example, or the arm member 50p be a ball point arm structure. Alternatively, the junction parts may be formed via a flexible leaf spring or a plastic film.

In addition, while description has been made supposing that the polymer actuator element 50 is in the shape of an oblong strip, the shape of the polymer actuator element 50 is not particularly limited as long as the polymer actuator element 50 has a certain length, and a displacement (bend) due to voltage application of one end part in the direction of length with respect to the other end part can be transmitted to an object (lens 51a) via the arm member 50p. Specifically, for example, a principal plane may be a triangle, an oval, or an indeterminate shape partially cut so as not to be in contact with another peripheral part.

Figure 15C:
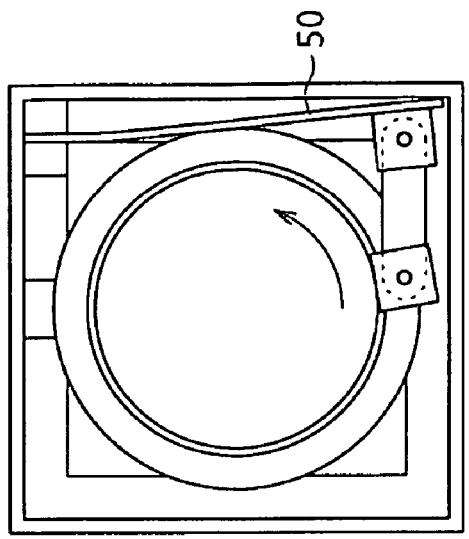
FIGS. 15A to 15C are side views showing states of rotation driving of the optical element module of FIGS. 14A and 14B.
Figure 15A:
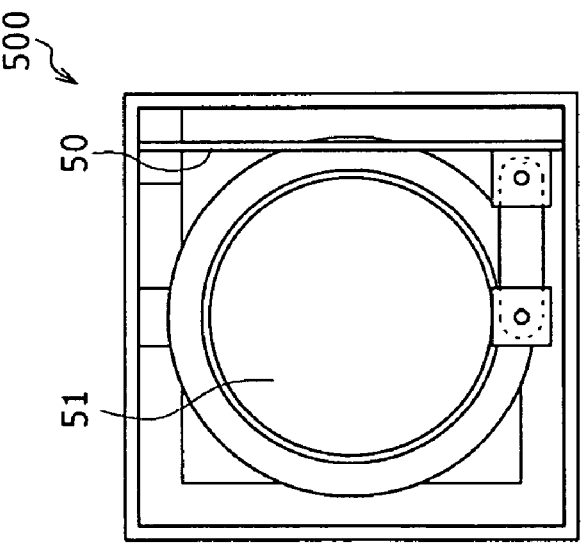
Figure 15B:
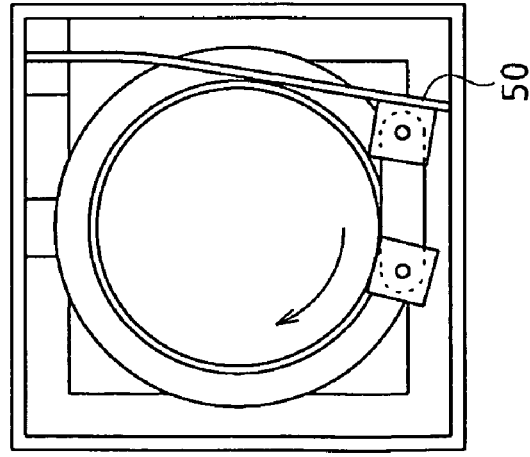

FIGS. 15A, 15B, and 15C show states of rotation driving of the optical element module 500.

In an initial state of the optical element module 500, as shown in FIG. 15A, the polymer actuator element 50 is perpendicularly upright from the inner wall of the fixing frame 52. When a voltage is then applied to the polymer actuator element 50, the polymer actuator element 50 is bent in the direction of the thickness, and the one end part of the polymer actuator element 50 is displaced to the lens 51a side. This displacement is transmitted to the lens 51a via the arm member 50p. The lens 51a and the light receiving element 51b (optical element 51) thus rotate clockwise on the optical axis (FIG. 15B). When a voltage of opposite polarity from FIG. 15B is applied to the polymer actuator element 50, the polymer actuator element 50 is bent in the direction of the thickness, and the one end part of the polymer actuator element 50 is displaced to a side away from the lens 51a. This displacement is transmitted to the lens 51a via the arm member 50p. The lens 51a and the light receiving element 51b (optical element 51) thus rotate counterclockwise on the optical axis (FIG. 15C).

Thus, the optical element 51 can be rotated to an arbitrary angle on the optical axis by adjusting the polarity and the voltage value of the voltage applied to the polymer actuator element 50.

Figure 16A:
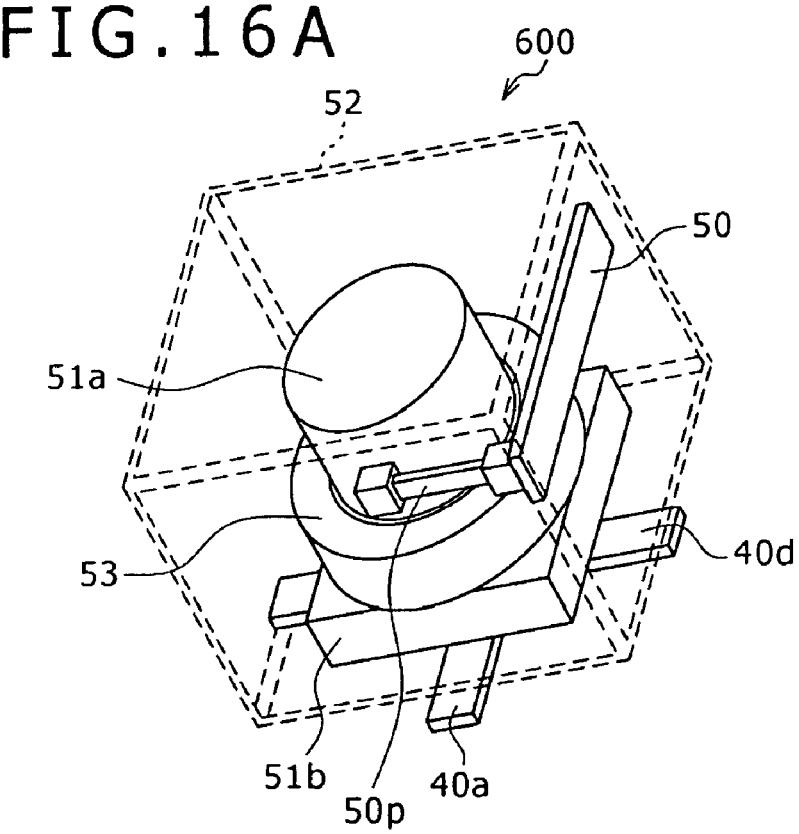
FIGS. 16A and 16B are schematic diagrams showing a constitution of a sixth embodiment of an optical element module.
Figure 16B:
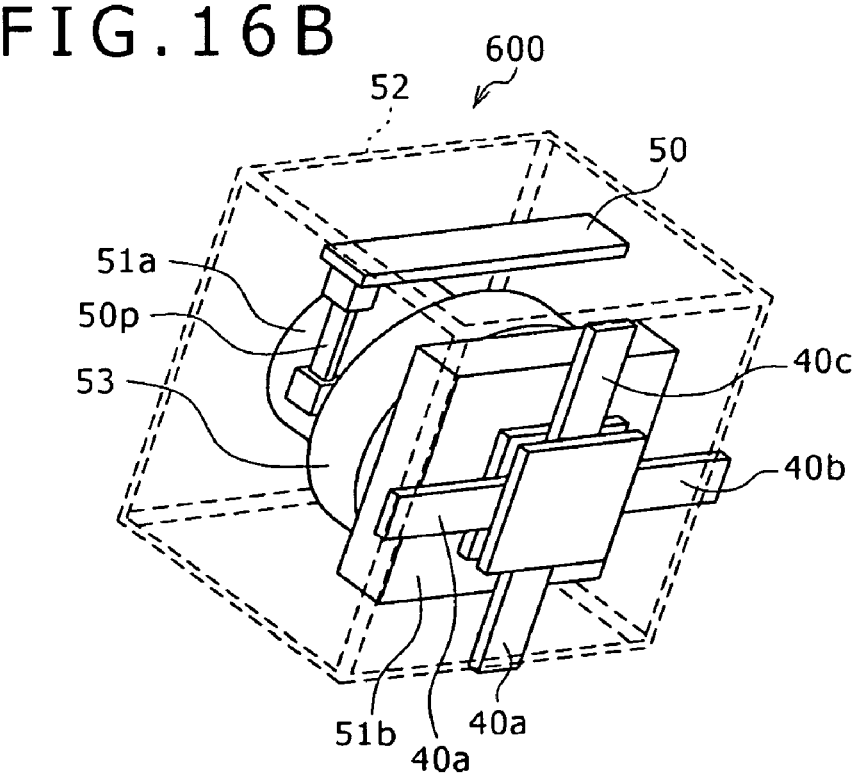

When an image pickup device to be described later is considered, it is possible to use both of a system for correcting for rotational movement such as the optical element module 500 or the like and a system for correcting for movement other than the rotation on the optical axis. Various optical systems and various digital systems can be adopted for optical axis movement correction in this case. An example thereof is shown in FIGS. 16A and 16B. FIGS. 16A and 16B show an optical element module 600 formed by adding the structure of the above-described optical element module 400 to the structure of the optical element module 500. Specifically, the optical element module 600 is formed by adding the structure of the polymer actuator elements 40a, 40b, 40c, and 40d and the base 42 in the optical element module 400 to the bottom surface of the fixing frame 52 (the bottom surface side of the light receiving element 51b) in the optical element module 500. In this case, the arm members 40p are omitted, and one end part of each of the polymer actuator elements 40a, 40b, 40c, and 40d is coupled to each of the four sides of the rectangular bottom surface of the fixing frame 52.

Description will next be made of a configuration of an image pickup device according to an embodiment.

Figure 17:
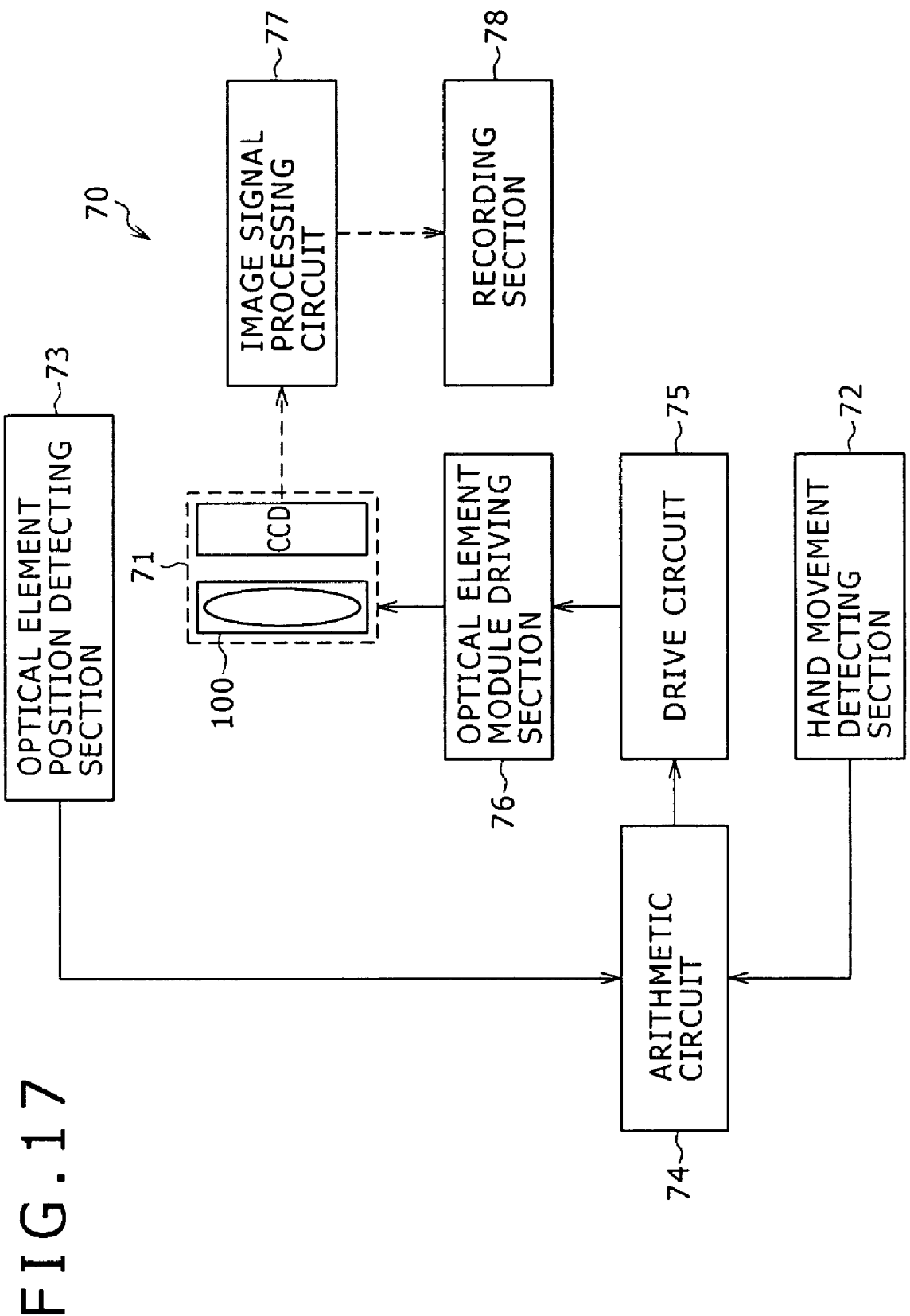
FIG. 17 is a block diagram showing a configuration of an image pickup device according to an embodiment.

FIG. 17 is a block diagram showing a configuration of an image pickup device according to an embodiment, centering on a hand movement correcting function.

As shown in FIG. 17, the image pickup device 70 includes: an image pickup optical system 71 formed by an optical element group of a plurality of lenses and a light receiving element CCD, a part of the image pickup optical system 71 being the optical element module 100 according to one embodiment; a hand movement detecting section 72 such as an acceleration sensor or the like; an optical element position detecting section 73 for detecting the position of the optical element forming the optical element module 100; an arithmetic circuit 74 for receiving a signal from the hand movement detecting section 72 and the optical element position detecting section 73 and performing arithmetic processing; a drive circuit 75 for receiving a signal from the arithmetic circuit 74; an optical element module driving section 76 for receiving a signal from the drive circuit 75 and controlling the driving of the optical element module 100; an image signal processing circuit 77 for subjecting an image signal output from the light receiving element CCD to image signal processing such as white balance correction, γ correction and the like; and a recording section 78 for storing data resulting from the signal processing. Incidentally, one of the optical element modules 200, 300, 400, 500, and 600 according to the foregoing embodiments may be substituted for the optical element module 100 of the image pickup optical system 71.

In the image pickup device 70, when photographing is started by pressing a shutter button or the like, an image signal resulting from image formation is output from the light receiving element CCD of the image pickup optical system 71. The image signal processing circuit 77 then subjects the image signal to image signal processing such as white balance correction, γ correction and the like. The recording section 78 stores data after the image signal processing.

Figure 18:
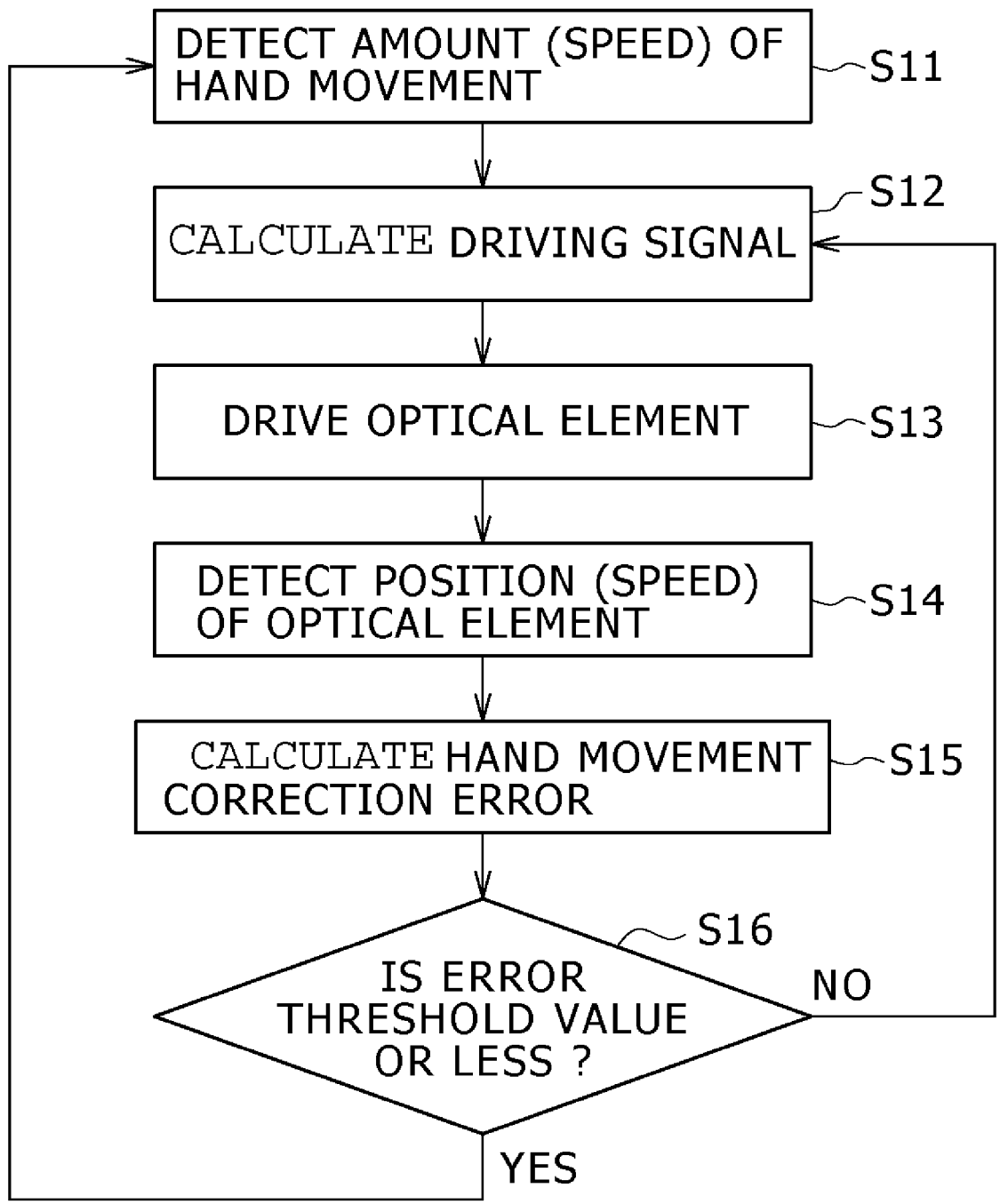
FIG. 18 is a flowchart of a hand movement correcting operation in the image pickup device of FIG. 17.

FIG. 18 represents an operation procedure of a hand movement correcting mechanism at a time of photographing in the image pickup device 70. Description in the following will be made supposing that a hand movement (optical axis movement) occurs at an instant of pressing the shutter button in the image pickup device 70.

(S11) At the instant of pressing the shutter button, the hand movement detecting section 72 detects the movement of the image pickup device 70 as a whole. Next, the arithmetic circuit 74 calculates an amount of hand movement (or speed) on the basis of a detection signal from the hand movement detecting section 72.

(S12) Next, the arithmetic circuit 74 calculates a target tilt angle (or a target rotation angle) for the optical element 11 of the optical element module 100 so as to cancel image movement that occurs depending on the amount of hand movement (or speed). The arithmetic circuit 74 further calculates and outputs a driving signal according to a result of calculation of an amount of driving from an initial state.

(S13) The drive circuit 75 controls the optical element module driving section 76 on the basis of the driving signal from the arithmetic circuit 74. Further, the optical element module driving section 76 under the control of the drive circuit 75 applies predetermined voltages to the respective actuator elements 10a, 10b, 10c, and 10d of the optical element module 100 to bend and displace the actuator elements 10a, 10b, 10c, and 10d. The optical element module driving section 76 thereby drives the optical element module 100 so that the optical element 11 is at a predetermined tilt angle (or a predetermined rotation angle) in a predetermined direction with respect to the optical axis of the optical element 11.

(S14) At this time, the optical element position detecting section 73 detects the tilt (rotational) position (or speed) of the optical element 11.

(S15) On the basis of a detection signal of the optical element position detecting section 73, the arithmetic circuit 74 calculates an error (hand movement correction error) from the target position for the optical element 11 which target position is obtained in step S12.

(S16) Next, when the hand movement correction error is equal to or less than a preset threshold value (YES), hand movement correcting operation at this time is ended, and preparation is made for a next hand movement correcting operation (to step S11). When the hand movement correction error exceeds the preset threshold value (NO), a return is made to step S12 to perform process operation from step S12 on down.

As a result of the above hand movement correcting operation, the optical element 11 in the optical element module 100 is accurately driven to the target position. Thus proper image pickup is made possible.

Incidentally, when the optical element module 100 whose optical element 11 is a lens and a lens holder or a lens is used in the image pickup device 70, by driving all of the polymer actuator elements 10*a*, 10*b*, 10*c*, and 10*d* by a same amount of displacement, the optical element 11 can be moved in the direction of the optical axis to adjust a focus or a zoom in image pickup. The same is true for a case where the optical element module 200 or 300 whose optical element 21 or 31 is a lens and a lens holder or a lens is applied.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical element module comprising:
an optical element; and
a plurality of actuator elements;
wherein each of said actuator elements has an ion conductive polymer film in a shape of a long and narrow plate and electrodes arranged on both sides of said ion conductive polymer film, and a whole of said actuator element is bent in a direction of thickness by applying a voltage between said electrodes, and
the direction of the thickness of said plurality of actuator elements is a direction of an optical axis of said optical element, said plurality of actuator elements are arranged at equal intervals around the optical axis of said optical element on a plane perpendicular to the optical axis of said optical element (XY plane), and a displacement due to said bend of one end part in a direction of length of at least one actuator element acts on one of a side surface and a bottom surface of said optical element to effect one of tilting and movement in the direction of the optical axis of said optical element.

2. The optical element module according to claim 1,
wherein said optical element is one of a lens, a lens and a lens holder, a light receiving element, and a combination of the lens, the lens holder, and the light receiving element.

3. The optical element module according to claim 1,
wherein said electrodes are a conductive film formed by dispersing carbon particles into a resin.

4. The optical element module according to claim 1,
wherein each of said actuator elements is formed by laminating, in the direction of the thickness, a plurality of actuator elements each having electrodes on both sides of an ion conductive polymer film in a shape of an oblong strip.

5. The optical element module according to claim 1, further comprising
a fixing frame for housing said optical element and said plurality of actuator elements,
wherein said plurality of actuator elements are four actuator elements in a form of an oblong strip, of the four actuator elements, two actuator elements are arranged in a point-symmetric relation to each other with respect to said optical axis with said optical element interposed between the two actuator elements in one direction (X-direction) on the XY plane, the other two actuator elements are arranged in a point-symmetric relation to each other with respect to said optical axis with said optical element interposed between the other two actuator elements in a direction (Y-direction) orthogonal to the X-direction, said one end part of each of the actuator elements is coupled to one of the bottom surface and the side surface of said optical element such that a displacement of the one end part can be transmitted to one of the bottom surface and the side surface of said optical element, and another end part of each of the actuator elements is fixed to the fixing frame.

6. The optical element module according to claim 1, further comprising:
an inner frame for containing said optical element; and
an outer frame for containing said inner frame together with said optical element,
wherein said plurality of actuator elements are four actuator elements in a shape of an oblong strip, of the four actuator elements, two actuator elements are arranged within said inner frame so as to be in a point-symmetric relation to each other with respect to said optical axis with said optical element interposed between the two actuator elements in one direction (X-direction) on the XY plane, said one end part of each of the two actuator elements is coupled to the side surface of said optical element such that a displacement of the one end part can be transmitted to the side surface of said optical element, and another end part of each of the two actuator elements is fixed to an inner wall of the inner frame, and the other two actuator elements are arranged within said outer frame so as to be in a point-symmetric relation to each other with respect to said optical axis with said inner frame and said optical element interposed between the other two actuator elements in a direction (Y-direction) orthogonal to the X-direction, said one end part of each of the other two actuator elements is coupled to an outer wall of said inner frame such that a displacement of the one end part can be transmitted to the outer wall of said inner frame, and another end part of each of the other two actuator elements is fixed to an inner wall of the outer frame.

7. The optical element module according to claim 1, further comprising
a flat-shaped base mounted with said optical element and said plurality of actuator elements,
wherein said plurality of actuator elements are three actuator elements or more arranged between the bottom surface of said optical element and the base and are arranged at equal intervals in a direction of length of the actuator elements along a circumference having the optical axis of said optical element as a center of the circumference, said one end part of each of the actuator elements is fixed to the bottom surface of said optical element, and another end part of each of the actuator elements is fixed to the base.

8. The optical element module according to claim 1, further comprising a base mounted with said plurality of actuator elements, wherein said plurality of actuator elements are four actuator elements in a shape of an oblong strip arranged on a bottom surface side of said optical element and are arranged such that directions of length of the actuator elements are directions of radiating from said optical axis as a center and such that actuator elements adjacent to each other form an angle of 90°, said one end part of each of the actuator elements is coupled to the bottom surface of said optical element via an arm member such that a displacement of the one end part can be transmitted to the bottom surface of said optical element, and another end part of each of the actuator elements is fixed to the base.

9. An image pickup device including an optical element module, the optical element module comprising:

an optical element; and a plurality of actuator elements;

wherein each of said actuator elements has an ion conductive polymer film in a shape of a long and narrow plate and electrodes arranged on both sides of said ion conductive polymer film, and a whole of said actuator element is bent in a direction of thickness by applying a voltage between said electrodes, the direction of the thickness of said plurality of actuator elements is a direction of an optical axis of said optical element, said plurality of actuator elements are arranged at equal intervals around the optical axis of said optical element on a plane perpendicular to the optical axis of said optical element (XY plane), and a displacement due to said bend of one end part in a direction of length of at least one actuator element acts on one of a side surface and a bottom surface of said optical element to effect one of tilting and movement in the direction of the optical axis of said optical, and wherein said optical element is tilted by driving said optical element module at a time of photographing to make hand movement correction.

10. An image pickup device including an optical element module, the optical element module comprising:

an optical element;

a plurality of actuator elements;

wherein each of said actuator elements has an ion conductive polymer film in a shape of a long and narrow plate and electrodes arranged on both sides of said ion conductive polymer film, and a whole of said actuator element is bent in a direction of thickness by applying a voltage between said electrodes, the direction of the thickness of said plurality of actuator elements is a direction of an optical axis of said optical element, said plurality of actuator elements are arranged at equal intervals around the optical axis of said optical element on a plane perpendicular to the optical axis of said optical element (XY plane), and a displacement due to said bend of one end part in a direction of length of at least one actuator element acts on one of a side surface and a bottom surface of said optical element to effect one of tilting and movement in the direction of the optical axis of said optical element; and a fixing frame for housing said optical element and said plurality of actuator elements, wherein said plurality of actuator elements are four actuator elements in a form of an oblong strip, of the four actuator elements, two actuator elements are arranged in a point-symmetric relation to each other with respect to said optical axis with said optical element interposed between the two actuator elements in one direction (X-direction) on the XY plane, the other two actuator elements are arranged in a point-symmetric relation to each other with respect to said optical axis with said optical element interposed between the other two actuator elements in a direction (Y-direction) orthogonal to the X-direction, said one end part of each of the actuator elements is coupled to one of the bottom surface and the side surface of said optical element such that a displacement of the one end part can be transmitted to one of the bottom surface and the side surface of said optical element, and another end part of each of the actuator elements is fixed to the fixing frame of which optical element is one of a lens and a lens holder or a lens in an image pickup optical system, and wherein said optical element is moved in the direction of the optical axis by driving said optical element module to make one of focus adjustment and zoom adjustment.

* * * * *